United States Patent
Gao

(10) Patent No.: US 11,710,490 B2
(45) Date of Patent: Jul. 25, 2023

(54) AUDIO DATA PROCESSING METHOD, APPARATUS AND STORAGE MEDIUM FOR DETECTING WAKE-UP WORDS BASED ON MULTI-PATH AUDIO FROM MICROPHONE ARRAY

(71) Applicant: TENCENT TECHNOLOGY (SHENZHEN) COMPANY LIMITED, Shenzhen (CN)

(72) Inventor: Yi Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 85 days.

(21) Appl. No.: 17/178,153

(22) Filed: Feb. 17, 2021

(65) Prior Publication Data

US 2021/0174812 A1    Jun. 10, 2021

Related U.S. Application Data

(63) Continuation of application No. PCT/CN2019/116572, filed on Nov. 8, 2019.

(30) Foreign Application Priority Data

Nov. 23, 2018  (CN) .......................... 201811409815.X

(51) Int. Cl.
*G10L 15/22*    (2006.01)
*G10L 21/0208*    (2013.01)
(Continued)

(52) U.S. Cl.
CPC .............. *G10L 17/20* (2013.01); *G10L 15/22* (2013.01); *G10L 17/02* (2013.01); *G10L 17/06* (2013.01);
(Continued)

(58) Field of Classification Search
CPC ......... G10L 17/20; G10L 17/02; G10L 17/06; G10L 17/22; G10L 21/0232; G10L 25/18;
(Continued)

(56) References Cited

U.S. PATENT DOCUMENTS 9,947,334 B2    4/2018  Gupta et al.
10,181,330 B2   1/2019  Han et al.
(Continued)

FOREIGN PATENT DOCUMENTS

CN    102932212 A    2/2013
CN    103282961 A    9/2013
(Continued)

OTHER PUBLICATIONS

Benesty, Jacob, et al. "On microphone-array beamforming from a MIMO acoustic signal processing perspective." IEEE Transactions on Audio, Speech, and Language Processing 15.3 (2007): 1053-1065. (Year: 2007).*

(Continued)

*Primary Examiner* — Jialong He
(74) *Attorney, Agent, or Firm* — Anova Law Group, PLLC

(57) ABSTRACT

An audio data processing method is provided. The method includes: obtaining multi-path audio data in an environmental space, obtaining a speech data set based on the multi-path audio data, and separately generating, in a plurality of enhancement directions, enhanced speech information corresponding to the speech data set; matching a speech hidden feature in the enhanced speech information with a target matching word, and determining an enhancement direction corresponding to the enhanced speech information having a highest degree of matching with the target matching word as a target audio direction; obtaining speech spectrum features in the enhanced speech information, and obtaining, from the (Continued)

speech spectrum features, a speech spectrum feature in the target audio direction; and performing speech authentication on the speech hidden feature and the speech spectrum feature that are in the target audio direction based on the target matching word, to obtain a target authentication result.

15 Claims, 9 Drawing Sheets

(51) Int. Cl.
    *G10L 17/20*     (2013.01)
    *G10L 17/02*     (2013.01)
    *G10L 17/06*     (2013.01)
    *G10L 17/22*     (2013.01)
    *G10L 21/0232*     (2013.01)
    *G10L 25/18*     (2013.01)
    *H04R 1/40*     (2006.01)
    *H04R 3/00*     (2006.01)
    *G10L 21/0216*     (2013.01)

(52) U.S. Cl.
    CPC .......... *G10L 17/22* (2013.01); *G10L 21/0232* (2013.01); *G10L 25/18* (2013.01); *H04R 1/406* (2013.01); *H04R 3/005* (2013.01); *G10L 2021/02082* (2013.01); *G10L 2021/02166* (2013.01)

(58) Field of Classification Search
    CPC .......... G10L 2021/02082; G10L 2021/02166; H04R 1/406; H04R 3/005
    See application file for complete search history.

(56) References Cited

U.S. PATENT DOCUMENTS

| | | | | |
|---|---|---|---|---|
| 2007/0021958 | A1* | 1/2007 | Visser | G10L 25/78 704/226 |
| 2013/0287225 | A1 | 10/2013 | Niwa et al. | |
| 2015/0006176 | A1* | 1/2015 | Pogue | G10L 15/22 704/249 |
| 2017/0178662 | A1 | 6/2017 | Ayrapetian et al. | |
| 2017/0278512 | A1* | 9/2017 | Pandya | G10L 21/0208 |
| 2017/0287499 | A1 | 10/2017 | Duong et al. | |
| 2018/0061432 | A1 | 3/2018 | Taniguchi et al. | |
| 2018/0075867 | A1 | 3/2018 | Dahl et al. | |
| 2018/0268809 | A1* | 9/2018 | Fujimura | G10L 15/02 |
| 2018/0336892 | A1* | 11/2018 | Kim | G10L 15/08 |
| 2019/0378530 | A1 | 12/2019 | Zhu et al. | |
| 2020/0335088 | A1 | 10/2020 | Gao et al. | |

FOREIGN PATENT DOCUMENTS

| | | |
|---|---|---|
| CN | 105590631 A | 5/2016 |
| CN | 106716526 A | 5/2017 |
| CN | 106782563 A | 5/2017 |
| CN | 107004425 A | 8/2017 |
| CN | 107464564 A | 12/2017 |
| CN | 107680593 A | 2/2018 |
| CN | 108475511 A | 8/2018 |
| CN | 108735227 A | 11/2018 |
| CN | 109599124 A | 4/2019 |
| CN | 110164446 A | 8/2019 |
| WO | 2009034524 A1 | 3/2009 |
| WO | 2018212953 A1 | 11/2018 |

OTHER PUBLICATIONS

Habets, "Speech Enhancement Using Microphone Arrays", [online] https://www.audiolabs-erlangen.de/content/05-fau/professor/00-mueller/02-teaching/2017w_apl/LabCourse_SpeechEnhancement.pdf (Year: 2017).*

The World Intellectual Property Organization (WIPO) International Search Report for PCT/CN2019/116572 dated Feb. 27, 2020 6 Pages (including translation).

The European Patent Office (EPO) Extended European search report for 19886684.0 Aug. 9, 2021 10 Pages (including translation).

The State Intellectual Property Office of the People's Republic of China (SIPO) Office Action 1 for for 201910745472.2 dated Jun. 16, 2021 12 Pages (including translation).

Stanislaw Gorlow et al., "Informed Audio Source Separation Using Linearly Constrained Spatial Filters," IEEE Transactions on Audio, Speech, and Language Processing, vol. 21, No. 1, Oct. 12, 2012. 11 pages.

Hua Han, "The Robust Performance of Near Field Multi-beam Forming," China Excellent Master's Thesis Full-text Database Information Technology Series, Jul. 15, 2018 (Jul. 15, 2018). 66 pages.

* cited by examiner

AUDIO DATA PROCESSING METHOD, APPARATUS AND STORAGE MEDIUM FOR DETECTING WAKE-UP WORDS BASED ON MULTI-PATH AUDIO FROM MICROPHONE ARRAY

RELATED APPLICATIONS

This application is a continuation application of PCT Patent Application No. PCT/CN2019/116572, filed on Nov. 8, 2019, which claims priority to Chinese Patent Application 201811409815.X, entitled "AUDIO DATA PROCESSING METHOD AND APPARATUS, AND STORAGE MEDIUM" filed with the China National Intellectual Property Administration on Nov. 23, 2018, all of which are incorporated herein by reference in entirety.

FIELD OF THE TECHNOLOGY

The present disclosure relates to the field of Internet technologies, and in particular, to an audio data processing method and apparatus, and a storage medium.

BACKGROUND

Artificial Intelligence (AI) is a theory, method, technology, and implementation system that uses a digital computer or a machine controlled by the digital computer to simulate, extend, and expand human intelligence, perceive an environment, acquire knowledge, and use knowledge to obtain a desirable result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline and relates to a wide range of technical areas including areas in hardware-level technologies and software-level technologies. The AI technology generally includes technologies such as a sensor, a dedicated AI chip, cloud computing, distributed storage, a big data processing technology, an operating/interaction system, and electromechanical integration. The AI software technology mainly includes several major directions such as a computer vision technology, a speech processing technology, a natural language processing technology, and machine learning/deep learning.

Certain technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

With the development of science and technology, smart speech devices are gradually popularized for use. In the implementation of a smart speech device, the speech interaction between a speech command and the smart speech device is an important technical means to realize device intelligence. In a speech interaction system of an existing smart speech device, the process of picking up wake-up and command words is inevitably interfered by noise of the external environment and other people's speech. If the interference noise is excessively strong, the sensitivity of the speech interaction system is severely affected, which further causes the wake-up failure or false wake-up phenomenon in the wake-up process of the device, that is, the accuracy of the device wake-up cannot be ensured.

SUMMARY

Embodiments of the present disclosure provide an audio data processing method and apparatus, and a storage medium, so that the false-recognition rate may be effectively reduced while the accuracy of speech control may be reasonably ensured.

One aspect of the present disclosure provides an audio data processing method, performed by an audio data processing device, the method including: obtaining multi-path audio data in an environmental space, obtaining a speech data set based on the multi-path audio data, and separately generating, in a plurality of enhancement directions, enhanced speech information corresponding to the speech data set; matching a speech hidden feature in the enhanced speech information with a target matching word, and determining an enhancement direction corresponding to the enhanced speech information having a highest degree of matching with the target matching word as a target audio direction; obtaining speech spectrum features in the enhanced speech information, and obtaining, from the speech spectrum features, a speech spectrum feature in the target audio direction; and performing speech authentication on the speech hidden feature and the speech spectrum feature that are in the target audio direction based on the target matching word, to obtain a target authentication result, the target authentication result being used for representing a probability of existence of the target matching word in the target audio direction for controlling a terminal.

Another aspect of the present disclosure provides an audio data processing apparatus, including: a memory storing computer program instructions; and a processor coupled to the memory and configured to executing the computer program instructions and perform obtaining multi-path audio data in an environmental space; obtaining a speech data set based on the multi-path audio data; separately generating, in a plurality of enhancement directions, enhanced speech information corresponding to the speech data set; matching a speech hidden feature in the enhanced speech information with a target matching word, and determine an enhancement direction corresponding to the enhanced speech information having a highest degree of matching with the target matching word as a target audio direction; obtaining speech spectrum features in the enhanced speech information, and obtaining, from the speech spectrum features, a speech spectrum feature in the target audio direction; and performing speech authentication on the speech hidden feature and the speech spectrum feature that are in the target audio direction based on the target matching word, to obtain a target authentication result, the target authentication result being used for representing a probability of existence of the target matching word in the target audio direction for controlling a terminal.

Yet An aspect of the embodiments of the present disclosure provides a non-transitory electronic-readable storage medium storing computer program instructions executable by at least one processor to perform: obtaining multi-path audio data in an environmental space, obtaining a speech data set based on the multi-path audio data, and separately generating, in a plurality of enhancement directions, enhanced speech information corresponding to the speech data set; matching a speech hidden feature in the enhanced speech information with a target matching word, and determining an enhancement direction corresponding to the enhanced speech information having a highest degree of matching with the target matching word as a target audio direction; obtaining speech spectrum features in the enhanced speech information, and obtaining, from the speech spectrum features, a speech spectrum feature in the target audio direction; and performing speech authentication on the speech hidden feature and the speech spectrum feature that are in the target audio direction based on the target matching word, to obtain a target authentication result, the target authentication result being used for representing a probability of existence of the target matching word in the target audio direction for controlling a terminal.

Other aspects of the present disclosure can be understood by those skilled in the art in light of the description, the claims, and the drawings of the present disclosure.

BRIEF DESCRIPTION OF THE DRAWINGS

To more clearly describe technical solutions of certain embodiments of the present disclosure, described below are accompanying drawings. The accompanying drawings are illustrative of embodiments of the present disclosure, and a person of ordinary skill in the art may still derive other drawings from these accompanying drawings without having to exert creative efforts.

DESCRIPTION OF EMBODIMENTS

To make objectives, technical solutions, and advantages of the present disclosure clearer and more comprehensible, certain embodiments of the present disclosure are further elaborated in detail with reference to the accompanying drawings. The described embodiments are not to be construed as a limitation to embodiments of the present disclosure. All other embodiments obtained by a person of ordinary skill in the art without creative efforts shall fall within the protection scope of embodiments of the present disclosure.

With the research and progress of AI technologies, the AI technology has been researched and applied in many fields, such as a common smart home, a smart wearable device, a virtual assistant, a smart speaker, smart marketing, unmanned driving, automatic driving, an unmanned aerial vehicle, a robot, smart medical care, smart customer service, and speech recognition. It is believed that with the development of technology, the AI technology will be applied in more fields and play a more important and valuable role.

Figure 1:
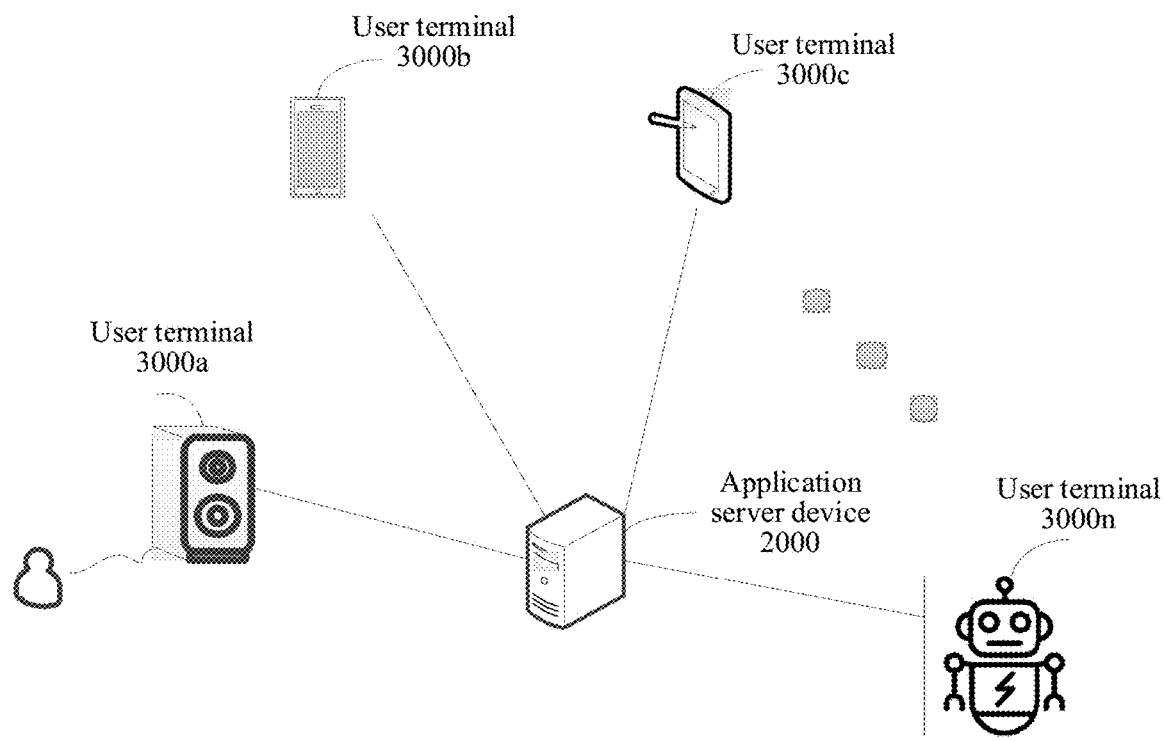
FIG. 1 is a schematic structural diagram of a network architecture according to one or more embodiments of the present disclosure.

FIG. 1 is a schematic structural diagram of a network architecture according to one or more embodiments of the present disclosure. As shown in FIG. 1, the network architecture may include an application server device 2000 and a user terminal cluster. The user terminal cluster may include a plurality of user terminals with a speech acquisition function, and as shown in FIG. 1, includes a user terminal 3000a, a user terminal 3000b, . . . , and a user terminal 3000n.

As shown in FIG. 1, the user terminal 3000a, the user terminal 3000b, . . . , and the user terminal 3000n may each establish a network connection to the application server device 2000. The plurality of user terminals may implement interaction between user data by using the application service device 2000 corresponding to a network service platform. The network service platform may be an audio network platform corresponding to an audio application installed in any user terminal. There may be one or more audio applications in any user terminal. For ease of understanding, in this embodiment of the present disclosure, a process of data exchange between a user terminal installed with the application (the application may be referred to as a target application) and the application server device 2000 is described by using an example that there is one audio application. Audio data in the target application may be referred to as multimedia data.

For ease of understanding, in this embodiment of the present disclosure, one user terminal may be selected from the plurality of user terminals shown in FIG. 1 as a target user terminal. For example, the user terminal 3000a shown in FIG. 1 may be used as the target user terminal. The target user terminal may include an intelligent terminal with a speech acquisition function, such as a smartphone, a tablet computer, a smart speaker, or a smart TV. Therefore, when the target user terminal is in an awake state, the target user terminal may further receive a speech control instruction for playing multimedia data, and can further send the speech control instruction to the application server device 2000, so that the application server device can return a playing address corresponding to the multimedia data to the target user terminal when authentication succeeds.

In view of this, for each user terminal with a speech acquisition function in this embodiment of the present disclosure, when each user terminal is not working, the user terminal can be put into a dormant state or a standby state. Therefore, when a user wants to start and use a user terminal, the user can interact with the user terminal through speech, that is, speech control on the user terminal can be implemented when the user terminal determines that there is a matching word that is in the multi-path audio data and that matches a target matching word stored in the terminal. For example, the foregoing dormant state or standby state may be switched to the awaken state (also referred to as a working state), that is, each user terminal can start and enter the working state when detecting that a wake-up word of the user terminal is matched up.

Any one-path audio data in the multi-path audio data may be an audio signal in an environmental space acquired by a speech acquisition apparatus (for example, a microphone in a microphone array) integrated in the user terminal. The audio signal may include a sound signal transmitted by the user in the environmental space, various noises in the environmental space, a sound signal transmitted by the terminal itself, and the like. That is, the audio signal may include at least one speech signal. The number of speech acquisition apparatuses integrated in the user terminal determines the number of paths of speech data obtained by the terminal. In view of this, one-path audio data may include all audio signals in the environmental space in which the terminal is located. Therefore, one-path audio data may include at least one speech signal in the environmental space acquired by one microphone.

The at least one speech signal may include a first speech signal and a second speech signal. The first speech signal may be understood as a sound signal transmitted by one or more users located in the environmental space. That is, the first speech signal is a sound signal that is transmitted by a user and acquired by a corresponding microphone in the microphone array. The second speech signal may be understood as a sound signal that is of sound played by the user terminal and that is received by each microphone. That is, the second speech signal is a sound signal that is transmitted by the terminal and that is acquired by the corresponding microphone in the microphone array.

Figure 2:
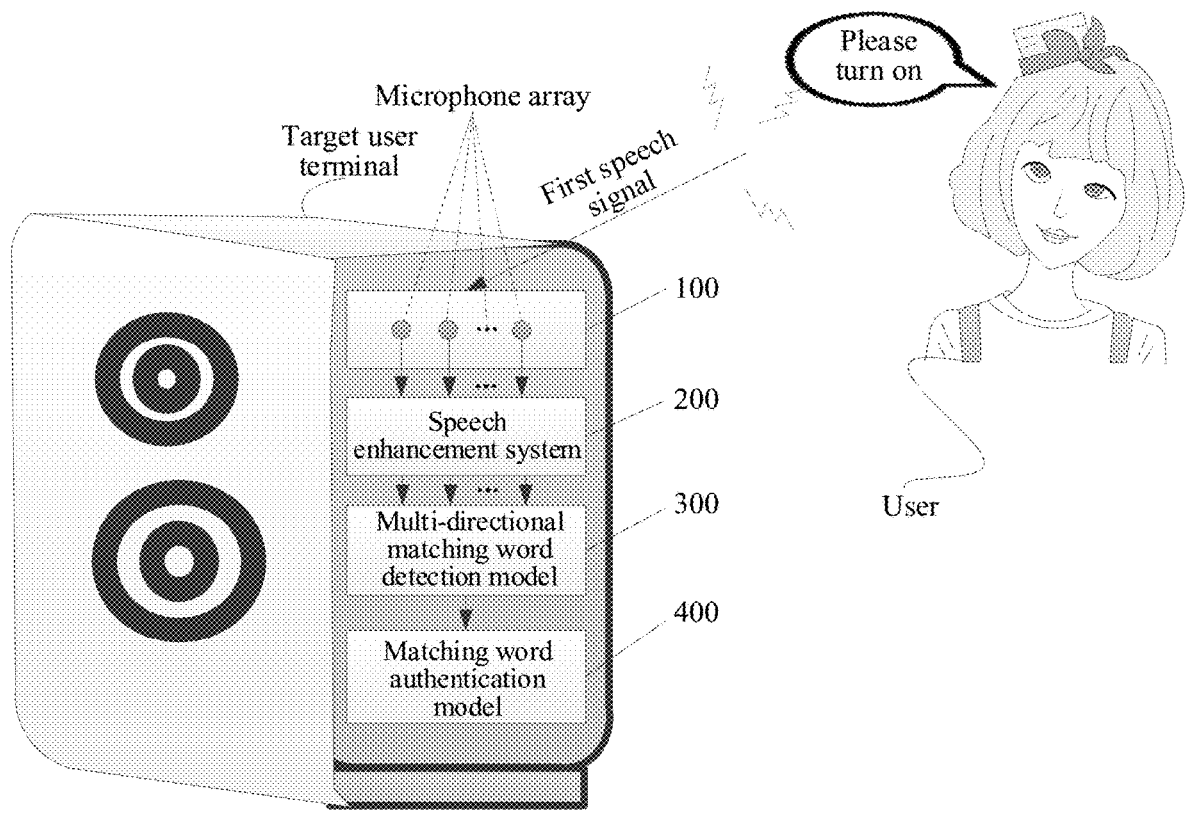
FIG. 2 is a schematic diagram of waking up a target user terminal according to one or more embodiments of the present disclosure.

For ease of understanding, further, FIG. 2 is a schematic diagram of waking up a target user terminal according to one or more embodiments of the present disclosure. As shown in FIG. 2, the target user terminal may be a smart speaker with a speech acquisition function. That is, the smart speaker may carry the foregoing microphone array with a speech acquisition function. The microphone array 100 in the smart speaker may be an array formed after a group of omnidirectional microphones located at different positions in space are arranged according to a specific shape rule, and further, reference may be made to the microphone array 100 shown in FIG. 2. As shown in FIG. 2, the microphone array may include N microphones, N being an integer greater than or equal to 2. Therefore, when the user shown in FIG. 2 wants to wake up the smart speaker, the microphone array 100 (that is, the foregoing N microphones) in the smart speaker may be used for receiving the sound signal transmitted by the user shown in FIG. 2 (the wake-up word carried in the sound signal may be "please turn on"). In addition, when there is noise in the environmental space, each microphone in the microphone array 100 may also be used for receiving the noise signal in the environmental space (the noise signal may also be a sound signal). Therefore, the target user terminal may refer to the sound signal that is transmitted by the user and that is acquired by any microphone and all other signals that can be acquired as audio signals, and further obtain the one-path audio data corresponding to the corresponding microphone. One-path audio data received by each microphone may include a first speech signal propagated in the foregoing environmental space, and the first speech signal may include the sound signal transmitted by the foregoing user and the noise signal in the foregoing environmental space (such as environmental noise and reverberant sound). Then, a speech enhancement system 200 shown in FIG. 2 may further receive audio data sent by each microphone in the microphone array 100, and further denoise the received multi-path audio data in the speech enhancement system 200, and combine the denoised multi-path audio data, so that a piece of enhanced speech information can be obtained in any one of M (M is an integer greater than or equal to 2) enhancement directions specified by the speech enhancement system 200. That is, the speech enhancement system 200 may send M pieces of enhanced speech information in the M enhancement directions to a multi-directional matching word detection model 300 shown in FIG. 2 separately, to determine whether the enhanced speech information in the M enhancement directions carries a target matching word (for example, a wake-up word). In other words, a degree of matching between the speech hidden feature in each piece of enhanced speech information and the target matching word may be obtained in the multi-directional matching word detection model 300. For example, M matching degrees may be obtained. A matching degree is related to enhanced speech information in an enhancement direction. Therefore, a highest matching degree may be determined from the matching degrees, and may also be referred to as the maximum matching degree, and the enhancement direction corresponding to the enhanced speech information with the highest matching degree may be further determined as the target audio direction, and the determined target audio direction is sent to the matching word authentication model 400 shown in FIG. 2, so that the matching word authentication model 400 can further perform speech authentication on the speech hidden feature and speech spectrum feature in the target audio direction based on the target matching word, to obtain the target authentication result. The target authentication result may be used for representing a probability of existence of the target matching word in the target audio direction for controlling a terminal (for example, waking up the smart speaker).

For the implementation of the wake-up method for waking up other intelligent terminals, reference may be made to the foregoing wake-up process of waking up the intelligent speaker by the user, and details are not described herein again. In addition to performing speech wake-up on the target user terminal, in this embodiment of the present disclosure, speech control may also be performed on the target user terminal, and for the specific process of performing speech control on the target user terminal, reference may also be made to the specific process of waking up the smart speaker by the user in the embodiment corresponding to FIG. 2, and details are not described herein again.

In view of this, in this embodiment of the present disclosure, audio signals are acquired by using the microphone array 100, so that a maximum number of speech signals transmitted by a user in the environmental space can be acquired, thereby ensuring that the acquired speech signals can include a maximum number of target matching words. In addition, by sending the audio data including the target matching word to the speech enhancement system 200, various noises carried in the audio data can be effectively reduced or eliminated, so that the enhanced speech information including the target matching word can be obtained in a plurality of enhancement directions, to ensure the success rate of recognition. In addition, the multi-directional wake-up word detection module 300 may perform matching word detection on the enhanced speech information in the plurality of enhancement directions in the target user terminal (for example, a smart speaker), thereby effectively improving the detection rate of target matching word. Further, the matching word authentication module 400 may further perform secondary authentication on the enhanced speech information in the determined target audio direction (that is, the enhancement direction corresponding to the enhanced speech information with the highest matching degree), to effectively suppress miscontrol, thereby determining the accuracy of speech control, and effectively reducing the miscontrol rate.

For the specific process of obtaining, by the target user terminal, the enhanced speech information corresponding to the speech data set, determining the target audio direction, and obtaining the target authentication result, reference may be made to the embodiments corresponding to FIG. 3 to FIG. 10.

Figure 3:
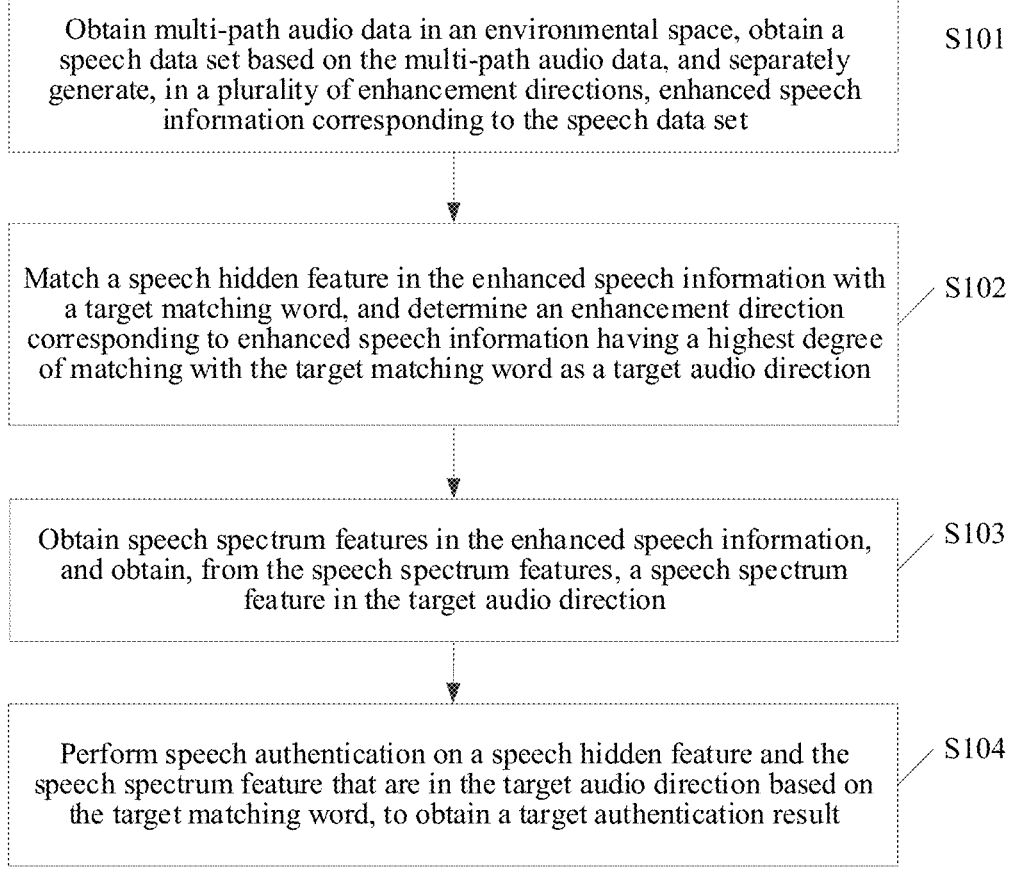
FIG. 3 is a schematic flowchart of an audio data processing method according to one or more embodiments of the present disclosure.

Further, FIG. 3 is a schematic flowchart of an audio data processing method according to one or more embodiments of the present disclosure. As shown in FIG. 3, the method may be performed by an audio data processing device shown in FIG. 12, and may include the following steps:

Step S101: Obtain multi-path audio data in an environmental space, obtain a speech data set based on the multi-path audio data, and separately generate, in a plurality of enhancement directions, enhanced speech information corresponding to the speech data set.

In certain embodiments, the target user terminal may obtain a microphone array corresponding to an environmental space in which the terminal is located. The microphone array may include a plurality of microphones, and array structures corresponding to the microphones. Further, the target user terminal may acquire an audio signal in the environmental space based on the array structure of each of the microphones, the audio signal including at least one speech signal. Further, the target user terminal may separately determine the at least one speech signal acquired by the each of the microphones as one-path audio data corresponding to the each of the microphones. The one-path audio data is the at least one speech signal acquired by one microphone. Then, the target user terminal may further add multi-path audio data to a speech data set, to separately generate, in a plurality of enhancement directions, enhanced speech information corresponding to the speech data set.

A non-limiting example of the microphone array is the microphone array 100 illustratively depicted in FIG. 2. That is, the microphone array may be an array formed after a group of omnidirectional microphones located at different positions in space are arranged according to a specific shape rule. Therefore, each microphone located in the environmental space may be used for acquiring speech data propagated in the environmental space. The audio data may include at least one speech signal acquired by each microphone. For example, one-path audio data corresponding to one microphone may include a first speech signal and a second speech signal, the first speech signal may be a sound signal that is transmitted by a user and acquired by the microphone array, and the second speech signal may be a sound signal that is transmitted by the terminal and acquired by the microphone array.

It may be understood that, each microphone located in the microphone array may be referred to as an array element, and the distribution distance and arrangement between the array elements determine the delay and strength of the audio signal received by each array element. For example, a microphone relatively close to a sound source may receive the audio signal first, while a microphone relatively far away from the sound source receives the audio signal later. The audio signal that includes at least one speech signal and that is acquired by each microphone may be referred to as one-path audio data. In addition, in daily life, the audio data acquired by each microphone (that is, the array element) usually carries different noises. That is, the audio data acquired by each microphone may be understood as a "polluted" speech that carries at least one type of noise. Therefore, to recover desired clean speech (for example, the sound signal "please turn on" transmitted by the user in the embodiment corresponding to FIG. 2) from the "polluted" noises, each path of audio data may need to be enhanced, to ensure that the clean speech can be outputted in the expected enhancement direction. That is, corresponding enhanced speech information may be generated in a plurality of set enhancement directions, to ensure the accuracy of subsequent speech recognition.

Figure 4:
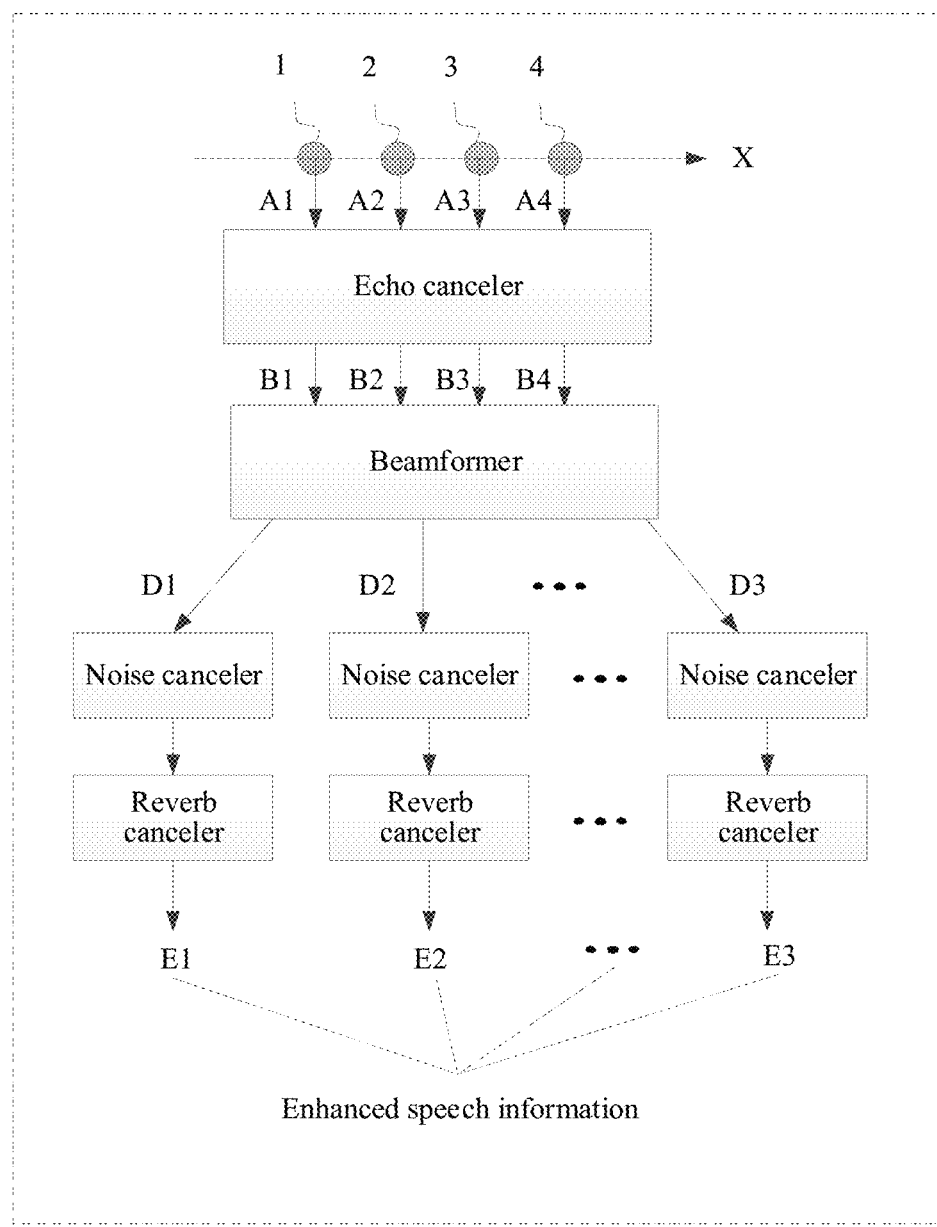
FIG. 4 is a schematic diagram of obtaining enhanced speech information according to one or more embodiments of the present disclosure.

For ease of understanding, further, FIG. 4 is a schematic diagram of obtaining enhanced speech information according to one or more embodiments of the present disclosure. As shown in FIG. 4, the microphone array may include four microphones, and the four microphones may be respectively located at different positions in the target user terminal, to form an array structure corresponding to the linearly distributed microphone array shown in FIG. 4. The array structure may be integrated in the target user terminal, so that the target user terminal has a corresponding speech acquisition function. For ease of understanding, a microphone 1, a microphone 2, a microphone 3, and a microphone 4 shown in FIG. 4 may be equally spaced at four different positions in the horizontal axis X direction. For example, the microphone 1 is located at a position A, the microphone 2 located at a position B, a microphone 3 is located at a position C and the microphone 4 is located at a position D. As shown in FIG. 4, each of the four microphones may be used for obtaining audio data (the audio data is the foregoing "polluted" speech that carries a plurality of noises) in the environmental space to obtain the four paths of audio data shown in FIG. 4 (that is, audio data A1, audio data A2, audio data A3, and audio data A4). Further, each of the four microphones may transmit the obtained audio data to an echo canceler shown in FIG. 4, to reduce or eliminate a sound signal that is transmitted by the terminal and acquired by each microphone in each path of audio data.

For ease of understanding, in this embodiment of the present disclosure, for example, one-path audio data (that is, the audio data A1) acquired by the microphone 1 is used as the target audio data, and the target audio data includes the first speech signal and the second speech signal. The first speech signal is the sound signal that is transmitted by the user and acquired by the microphone array shown in FIG. 4, and the second speech signal is the sound signal that is transmitted by the terminal (that is, the speaker of the target user terminal) and acquired by the microphone array. When the microphone 1 sends the audio data A1 to the echo canceler shown in FIG. 4, the echo canceler may reduce or eliminate the second speech signal in the audio data A1, and determine the audio data A1 from which the second speech signal is reduced or eliminated (that is, the target audio data) as to-be-enhanced speech data, to obtain to-be-enhanced speech data B1 shown in FIG. 4.

For each microphone in the microphone array, the audio data acquired by each microphone includes a sound signal (that is, the first speech signal) transmitted by the user (for example, a user A) and a sound signal (that is, the second speech signal) transmitted by the speaker of the terminal. Therefore, the audio data A1 shown in FIG. 4 may include the first speech signal and the second speech signal, the audio data A2 may include the first speech signal and the second speech signal, the audio data A3 may include the first speech signal and the second speech signal, and the audio data A4 may also include the first speech signal and the second speech signal. Therefore, after the four paths of audio data are sent to the echo canceler shown in FIG. 4, to-be-enhanced speech data B1 corresponding to the audio data A1, to-be-enhanced speech data B2 corresponding to the audio data A2, to-be-enhanced speech data B3 corresponding to the audio data A3 and to-be-enhanced speech data B4 corresponding to the audio data A4 may be obtained. For the specific implementation of outputting the to-be-enhanced speech data B2, the to-be-enhanced speech data B3, and the to-be-enhanced speech data B4 by the echo canceler, reference may be made to the specific implementation process of outputting the foregoing to-be-enhanced speech data B1 by the echo canceler, and details are not described herein again. Further, Table 1 is a table of a mapping relationship between audio data and to-be-enhanced speech data according to one or more embodiments of the present disclosure.

TABLE 1

| | Microphone array | | | |
|---|---|---|---|---|
| | Microphone 1 | Microphone 2 | Microphone 3 | Microphone 4 |
| Audio data | A1 = (b1 + c1) | A2 = (b2 + c2) | A3 = (b3 + c3) | A4 = (b4 + c4) |
| To-be-enhanced speech data | B1 | B2 | B3 | B4 |

As shown in Table 1, b1, b2, b3, and b4 are sound signals transmitted by the user A. The sound signal that is transmitted by the user A and that is acquired by the four different microphones may be referred to as the first speech signal, and the first speech signal may be represented by b1, b2, b3, and b4 in corresponding audio data; c1, c2, c3, and c4 are sound signals transmitted by the target user terminal. The sound signal that is transmitted by the target user terminal and that is acquired by the four different microphones may be referred to as the second speech signal, and the second speech signal may be represented by c1, c2, c3, and c4 in corresponding audio data. In other words, b1 in the audio data A1 is the first speech signal, and c1 is the second speech signal; if the target user terminal sends the audio data A1 acquired by the microphone 1 in Table 1 to the echo canceler shown in FIG. 4, the audio data A1 from which the second speech signal (that is, c1) is reduced or eliminated may be determined as to-be-enhanced speech data, that is, the to-be-enhanced speech data B1 shown in Table 1 can be obtained, and the to-be-enhanced speech data B1 includes the first speech signal (that is, b1) acquired by the microphone 1. Similarly, b2 in the audio data A2 is the first speech signal, and c2 is the second speech signal; if the target user terminal sends the audio data A2 acquired by the microphone 2 in Table 1 to the echo canceler shown in FIG. 4, the audio data A2 from which the second speech signal (that is, c2) is reduced or eliminated may be determined as to-be-enhanced speech data, that is, the to-be-enhanced speech data B2 shown in Table 1 can be obtained, and the to-be-enhanced speech data B2 includes the first speech signal (that is, b2) acquired by the microphone 2. Similarly, b3 in the audio data A3 is the first speech signal, and c3 is the second speech signal; if the target user terminal sends the audio data A3 acquired by the microphone 3 in Table 1 to the echo canceler shown in FIG. 4, the audio data A3 from which the second speech signal (that is, c3) is reduced eliminated may be determined as to-be-enhanced speech data, that is, the to-be-enhanced speech data B3 shown in Table 1 can be obtained, and the to-be-enhanced speech data B3 includes the first speech signal (that is, b3) acquired by the microphone 3. Similarly, b4 in the audio data A4 is the first speech signal, and c4 is the second speech signal; if the target user terminal sends the audio data A4 acquired by the microphone 4 in Table 1 to the echo canceler shown in FIG. 4, the audio data A4 from which the second speech signal (that is, c4) is reduced or eliminated may be determined as to-be-enhanced speech data, that is, the to-be-enhanced speech data B4 shown in Table 1 can be obtained, and the to-be-enhanced speech data B4 includes the first speech signal (that is, b4) acquired by the microphone 4. Then, the target user terminal may further send each piece of to-be-enhanced speech data to a beamformer shown in FIG. 4, so that the four paths of to-be-enhanced speech data can be further combined in the beamformer, thereby obtaining corresponding enhanced speech information in a plurality of enhancement directions of the beamformer.

The target user terminal may further add the four pieces of to-be-enhanced speech data to the speech data set after obtaining the four pieces of to-be-enhanced speech data. The speech data set may include sound signals of the user A (that is, b1, b2, b3, and b4) acquired by the microphones, so that the four pieces of to-be-enhanced speech data in the speech data set can be sent together to the beamformer shown in FIG. 4, and in this way, the beamformer can further perform signal superposition on the four pieces of to-be-enhanced speech data in the speech data set in different combinations (that is, the to-be-enhanced speech data B1, the to-be-enhanced speech data B2, the to-be-enhanced speech data B3, and the to-be-enhanced speech data B4), so that corresponding enhanced speech information can be obtained in a plurality of enhancement directions of the beamformer.

It may be understood that, the echo canceler may be used for reducing or eliminating the speech signal that is transmitted by the terminal and acquired by each microphone in each path of audio data. Therefore, after each piece of to-be-enhanced speech data from which the second speech signal is filtered out is sent to the beamformer, the to-be-enhanced speech data may be superposed to output, in a plurality of enhancement directions, directional enhanced data D1, directional enhanced data D2, and directional enhanced data D3 in the corresponding embodiment corresponding to FIG. 4. The first speech signal inputted to the beamformer is the first speech signal (that is, the sound signal of the user A acquired by each microphone) in the speech data set. In view of this, the first speech signal in the speech data set may be understood as including the first speech signal (that is, b1) acquired by the microphone 1, the first speech signal (that is, b2) acquired by the microphone 2, the first speech signal (b3) acquired by the microphone 3, and the first speech signal (b4) acquired by the microphone 4.

In another example, using the three enhancement directions of the beamformer as an example, directional enhanced data respectively corresponding to the three enhancement directions, for example, directional enhanced data D1, directional enhanced data D2, and directional enhanced data D3 can be obtained. Directional enhanced data D1=first speech signal b1*k11+first speech signal b2*k21+first speech signal b3*k31+first speech signal b4*k41, where k11, k21, k31, and k41 can be used for modifying the phase and amplitude of each piece of to-be-enhanced speech data inputted to the beamformer. Similarly, directional enhanced data D2=first speech signal b1*k12+first speech signal b2*k22+first speech signal b3*k32+first speech signal b4*k42, where k12, k22, k32, and k42 can be used for modifying the phase and amplitude of each piece of to-be-enhanced speech data inputted to the beamformer. Directional enhanced data D3=first speech signal b1*k13+first speech signal b2*k23+ first speech signal b3*k33+first speech signal b4*k43, where k13, k23, k33, and k43 can be used for modifying the phase and amplitude of each piece of to-be-enhanced speech data inputted to the beamformer.

As shown in FIG. 4, the number of pieces of directional enhanced data outputted by the beamformer depends on the number of enhancement directions of the beamformer (that is, the direction in which the beamformer expects to perform enhancement). One piece of directional enhanced data may be outputted in an enhancement direction.

When receiving the speech data set including the first speech signal b1, the first speech signal b2, the first speech signal b3, and the first speech signal b4, the beamformer in the target user terminal may collectively refer to the first speech signal b1, the first speech signal b2, the first speech signal b3, and the first speech signal b4 in the speech data set as the first speech signal in the speech data set, so that the first speech signal in the speech data set can be enhanced in the beamformer, and the enhanced speech information corresponding to the speech data set may be generated in the plurality of enhancement directions of the beamformer, to obtain the enhanced speech information E1, the enhanced speech information E2, and the enhanced speech information E3 in the embodiment corresponding to FIG. 4. The enhanced speech information E1, the enhanced speech information E2, and the enhanced speech information E3 may be collectively referred to as the enhanced speech information corresponding to the speech data set.

The target user terminal may directly send the to-be-enhanced speech data B1 including the first speech signal b1, the to-be-enhanced speech data B2 including the first speech signal b2, the to-be-enhanced speech data B3 including the first speech signal b3, and the to-be-enhanced speech data B4 including the first speech signal b4 to the beamformer shown in FIG. 4, so that the speech data set can be enhanced in a beam direction (that is, a direction in which enhancement may need to be performed) specified in the beamformer, and the enhanced speech information of the corresponding direction can be separately generated in the plurality of enhancement directions of the beamformer, to obtain the enhanced speech information E1, the enhanced speech information E2, and the enhanced speech information E3 in the embodiment corresponding to FIG. 4. In this case, the enhanced speech information E1, the enhanced speech information E2, and the enhanced speech information E3 in each enhancement direction may be referred to as enhanced speech information.

Figure 5:
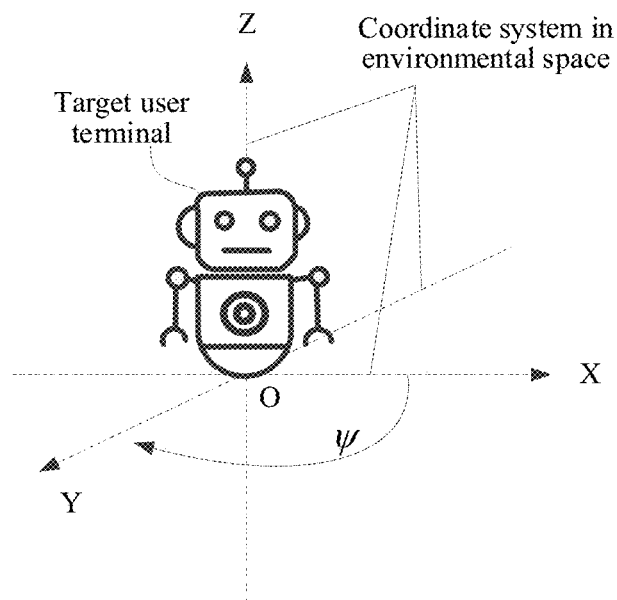
FIG. 5 is a schematic diagram of an environmental space according to one or more embodiments of the present disclosure.

Further, FIG. 5 is a schematic diagram of an environmental space according to one or more embodiments of the present disclosure. The target user terminal (intelligent robot) may be located in a coordinate system of the environmental space shown in FIG. 5. That is, in this case, the intelligent robot is located in the XOY plane of the coordinate system. When a user (for example, a user A) wants to wake up the target user terminal, to improve the detection rate of the wake-up word carried in the sound signal transmitted by the user, that is, to detect a wake-up word consistent with the target matching word stored in the terminal, enhanced speech information corresponding to the speech data set may need to be generated in a plurality of enhancement directions (for example, directions in which enhancement is expected to be performed such as $\psi=0$ degree, 90 degrees, and 180 degrees) of the speech enhancement system in the target user terminal. In other words, to improve the detection rate of wake-up words, directional enhanced data corresponding to the first speech signal in the speech data set may need to be pre-generated in the enhancement direction of the speech enhancement system. That is, the enhanced first speech signals may be respectively outputted in expected directions (that is, enhancement directions) such as 0 degree, 90 degrees, and 180 degrees through the beamformer in the speech enhancement system and the enhanced first speech signals are used as directional enhanced data in the enhancement directions. The directional enhanced data in each enhancement direction has directivity. Therefore, if the sound signal transmitted by the user comes from a direction near the 0-degree direction, that is, the user in the direction near the 0-degree direction says the wake-up word for waking up the terminal (that is, controlling the terminal), the beamformer enhances, in the 0-degree direction, the sound signal transmitted by the user, and inhibits sound signals from other directions (for example, 90-degree and 180-degree directions), to obtain the enhanced first speech signal in the 0-degree direction, and use the enhanced first speech signal as directional enhanced data in the 0-degree direction (for example, D1 in the embodiment corresponding to FIG. 4). In addition, the directional enhanced data D1 is obtained by superposing the first speech signal b1, the first speech signal b2, the first speech signal b3 and the first speech signal b4. Similarly, if the sound signal transmitted by the user comes from a direction near the 90-degree direction, the sound signal transmitted by the user is enhanced in the 90-degree direction, and the sound signals from other directions (for example, the 0-degree and 180-degree directions) are inhibited, so that the enhanced first speech signal can be obtained in the 90-degree direction, and the enhanced first speech signal is used as the directional enhanced data in the 90-degree direction (for example, D2 in the embodiment corresponding to FIG. 4), and the directional enhanced data is obtained by superposing the first speech signal b1, the first speech signal b2, the first speech signal b3 and the first speech signal b4. Similarly, if the sound signal transmitted by the user comes from a direction near the 180-degree direction, that is, the beamformer enhances, in the 180-degree direction, the sound signal transmitted by the user, and inhibits sound signals from other directions (for example, 0-degree and 90-degree directions), to obtain the enhanced first speech signal in the 180-degree direction, and use the enhanced first speech signal as directional enhanced data in the 180-degree direction (for example, D3 in the embodiment corresponding to FIG. 4). In addition, the directional enhanced data D3 is obtained by superposing the first speech signal b1, the first speech signal b2, the first speech signal b3 and the first speech signal b4.

Further, the target user terminal may send the directional enhanced data in the three directions to the noise canceler and the reverb canceler shown in FIG. 4, to filter out the environmental noise carried in the directional enhanced data, so that clean speech can be recovered from the "polluted" noise, to obtain corresponding enhanced speech signals in a plurality of enhancement directions (that is, enhanced speech information E1, enhanced speech information E2, and enhanced speech information E3 obtained after the sound signal transmitted by the user is denoised can be obtained). When it is possible for the speaker to say a wake-up word from one of the three enhancement directions of 0 degree, 90 degrees, and 180 degrees, the wake-up word can be found in the enhanced speech information respectively corresponding to the plurality of pieces of directional enhanced data. That is, a matching word (for example, a wake-up word) included in at least one piece of enhanced speech information can be more easily detected by the multi-directional matching word detection model 300.

If the audio data acquired in the environmental space includes a sound signal transmitted by only one user, based on the beamformer in the embodiment corresponding to FIG. 4, three pieces of enhanced speech information corresponding to the user can be obtained in specified directions such as 0-degree, 90-degree, and 180-degree directions.

The specific process of obtaining the speech data set based on the multi-path audio data may be described as: obtaining a target microphone from the microphones of the microphone array, and using audio data that includes the first speech signal and the second speech signal and that corresponds to the target microphone as target audio data; reducing or eliminating the second speech signal in the target audio data by using an echo canceler, and determining the target audio data from which the second speech signal is reduced or eliminated as to-be-enhanced speech data; and obtaining to-be-enhanced speech data separately corresponding to each path of audio data, when or in response to determining the each of the microphones in the microphone array is the target microphone.

Further, each piece of to-be-enhanced speech data is added to the speech data set, to separately generate, in a plurality of enhancement directions, enhanced speech information corresponding to the speech data set.

The first speech signal in the foregoing speech data set is a sound signal that is transmitted by a user and acquired by the microphone array. Therefore, if the environmental space includes sound signals transmitted by a plurality of users, the first speech signal in the speech data set may include sound signals that are transmitted by a plurality of users and acquired by the microphone array.

Figure 6:
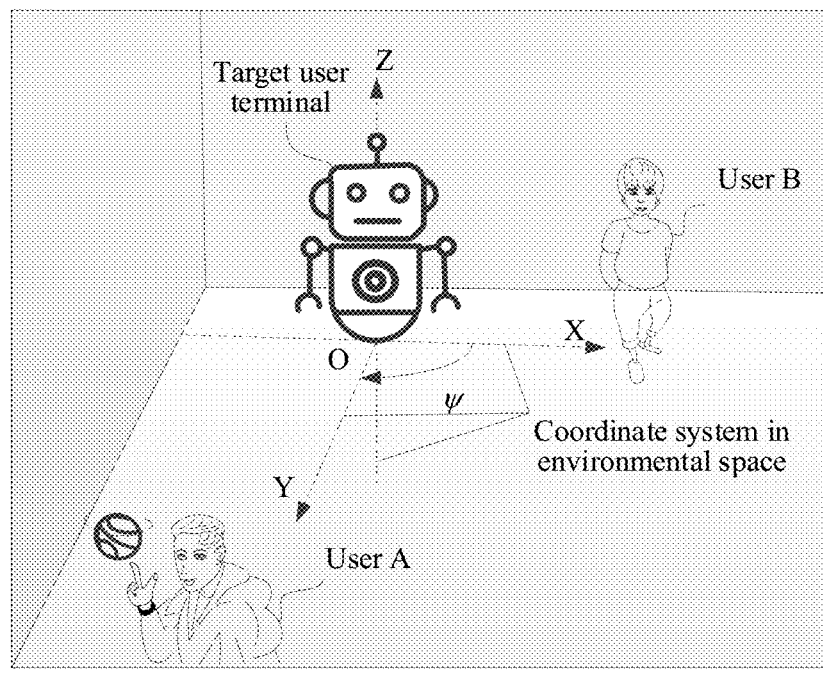
FIG. 6 is a schematic diagram of another environmental space according to one or more embodiments of the present disclosure.

For ease of understanding, further, FIG. 6 is a schematic diagram of another environmental space according to one or more embodiments of the present disclosure. As shown in FIG. 6, there are two users in the environmental space, and the two users are respectively located in different directions centering around the target user terminal. That is, the user B is located in an X-axis (that is, $\psi=0$ degree) centering around the target user terminal, and the user A is located in a Y-axis (that is, $\psi=90$ degrees) centering around the target user terminal. Assuming that at a moment T, the user A and the user B both transmit sound signals in the environmental space centering around the target user terminal, the microphone array in the target user terminal shown in FIG. 6 (for example, the microphone array in the embodiment corresponding to FIG. 5) may acquire the sound signals transmitted by the two users. That is, according to the specific implementation process of obtaining the speech data set based on the multi-path audio data in the embodiment corresponding to FIG. 5, it can be learned that the first speech signal in the speech data set obtained by the target user terminal may simultaneously include sound signals that are transmitted by the user A and the user B and that are acquired by the microphones. Further, Table 2 is a table of a mapping relationship between to-be-enhanced speech data and directional enhanced data according to one or more embodiments of the present disclosure.

TABLE 2

| | Microphone array | | | |
|---|---|---|---|---|
| | Microphone 1 | Microphone 2 | Microphone 3 | Microphone 4 |
| To-be-enhanced speech data | B1 = (m1 + m2) | B2 = (m1 + m2) | B3 = (m1 + m2) | B4 = (m1 + m2) |
| Speech data set | | C | | |
| Directional enhanced data | D1 | | D2 | D3 |
| Enhanced speech information | E1 | | E2 | E3 |

As shown in the foregoing Table 2, m1 is the sound signal transmitted by user A, and m2 is the sound signal transmitted by the user B. The sound signals that are transmitted by the user A and acquired by the four different microphones may be referred to as sound sub-signals transmitted by the user A, and the sound sub-signal transmitted by the user A may be represented by m1 in corresponding speech data. Similarly, the sound signals that are transmitted by the user B and acquired by the four different microphones may be referred to as sound sub-signals transmitted by the user B, and the sound sub-signal transmitted by the user B may be represented by m2 in corresponding speech data. In other words, if the target user terminal sends the audio data A1 (A1=(b1+c1)) acquired by the microphone 1 in Table 2 to the echo canceler shown in FIG. 4, the audio data A1 from which the second speech signal (that is, c1) is reduced or eliminated may be determined as to-be-enhanced speech data, that is, the to-be-enhanced speech data B1 shown in Table 2 can be obtained, and the to-be-enhanced speech data B1 includes the first speech signal (that is, b1=(m1+m2)) acquired by the microphone 1. The speech sub-signal m1 is the sound sub-signal transmitted by the user A, and the speech sub-signal B2 is the sound sub-signal transmitted by the user B. Similarly, if the target user terminal sends the audio data A2 (A2=(b2+c2)) acquired by the microphone 2 in Table 2 to the echo canceler shown in FIG. 4, the audio data A2 from which the second speech signal (that is, c2) is reduced or eliminated may be determined as to-be-enhanced speech data, that is, the to-be-enhanced speech data B2 shown in Table 2 can be obtained, and the to-be-enhanced speech data B2 includes the first speech signal (that is, b2=(m1+m2)) acquired by the microphone 2. Similarly, if the target user terminal sends the audio data A3 (A3=(b3+c3)) acquired by the microphone 3 in Table 2 to the echo canceler shown in FIG. 4, the audio data A3 from which the second speech signal (that is, c3) is reduced or eliminated may be determined as to-be-enhanced speech data, that is, the to-be-enhanced speech data B3 shown in Table 2 can be obtained, and the to-be-enhanced speech data B3 includes the first speech signal (that is, b3=(m1+m2)) acquired by the microphone 3. Similarly, if the target user terminal sends the audio data A4 (A4=(b4+c4)) acquired by the microphone 4 in Table 2 to the echo canceler shown in FIG. 4, the audio data A4 from which the second speech signal (that is, c4) is reduced or eliminated may be determined as to-be-enhanced speech data, that is, the to-be-enhanced speech data B4 shown in Table 2 can be obtained, and the to-be-enhanced speech data B4 includes the first speech signal (that is, b4=(m1+m2)) acquired by the microphone 4. Then, the target user terminal may further add each piece of to-be-enhanced speech data shown in Table 2 to a speech data set C in the foregoing Table 2, and send each piece of to-be-enhanced speech data in the speech data set C together to the beamformer, to separately generate, in a plurality of enhancement directions of the beamformer, enhanced speech information corresponding to the speech data set C. In other words, the first speech signal in the speech data set C shown in Table 2 may include the sound sub-signal (that is, m1) transmitted by the user A and the sound sub-signal (that is, m2) transmitted by the user B.

The user A is located in the direction of $\psi=90$ degrees, the user B is located in the direction of $\psi=0$ degree, and the beamformer in the target user terminal may generate the enhanced speech information corresponding to the speech data set in enhancement directions such as $\psi=0$ degree, 90 degrees, and 180 degrees. Therefore, for sound source signals received from the enhancement directions of $\psi=0$ degree and 90 degrees, the beamformer may enhance the sound source signal in the target enhancement direction in a process of obtaining directional enhanced data in corresponding enhancement directions, and inhibit the sound source signals in the remaining enhancement directions at the same time. The remaining enhancement directions may be understood as enhancement directions in the plurality of enhancement directions of the beamformer except the target enhancement direction. Therefore, for the target user terminal in FIG. 6, if the enhanced speech information corresponding to the speech data set may need to be generated in a plurality of enhancement directions, any enhancement direction may be selected from the plurality of enhancement directions of the beamformer as the target enhancement direction, and the first speech signal in the speech data set is enhanced based on the beamformer, and the enhanced first speech signal is used as directional enhanced data in the target enhancement direction. Further, the target user terminal may filter out the environmental noise carried in the directional enhanced data based on the noise canceler and the reverb canceler, and determine the directional enhanced data from which the environmental noise is filtered out as the enhanced speech information corresponding to the speech data set; when each of the plurality of enhancement directions is selected as the target enhancement direction, the enhanced speech information of the speech data set in each enhancement direction, that is, the enhanced speech information E1, the enhanced speech information E2, and the enhanced speech information E3 shown in Table 2, can be obtained.

For ease of understanding, the target user terminal may determine the enhancement direction of $\psi=0$ degree in the beamformer as the target enhancement direction, and determine, in the target enhancement direction, the user B as a first user, and determine the user A as a second user, that is, the first user is a user in the target enhancement direction, and the second user is a user in an enhancement direction in the plurality of enhancement directions except the target enhancement direction. In this case, the target user terminal may enhance, based on the beamformer, the sound sub-signal transmitted by the first user in the speech data set, and inhibit, in the target enhancement direction, interference data generated by the sound sub-signal transmitted by the second user, to output the enhanced first speech signal. In this case, the enhanced first speech signal obtained by the target user terminal in the target enhancement direction may be understood as the directional enhanced data in the direction of $\psi=0$ degree, for example, the directional enhanced data in the direction of $\psi=0$ degree may be the directional enhanced data D1 in Table 2, that is, the directional enhanced data D1=(to-be-enhanced speech data B1\*k11+to-be-enhanced speech data B2\*k21+to-be-enhanced speech data B3\*k31+to be enhanced speech data B4\*k41). Therefore, in this case, the sound amplitude of the sound sub-signal that is transmitted by the user B and included in the directional enhanced data D1 is relatively large, and the sound amplitude of the sound sub-signal transmitted by user A is relatively small. Similarly, the target user terminal may determine the enhancement direction of $\psi=90$ degrees in the beamformer as the target enhancement direction, and determine, in the target enhancement direction, the user A as a first user, and determine the user B as a second user, that is, the first user is a user in the target enhancement direction, and the second user is a user in an enhancement direction in the plurality of enhancement directions except the target enhancement direction. In this case, the target user terminal may enhance, based on the beamformer, the sound sub-signal transmitted by the first user in the speech data set, and inhibit, in the target enhancement direction, interference data generated by the sound sub-signal transmitted by the second user, to output the enhanced first speech signal. In this case, the enhanced first speech signal obtained by the target user terminal in the target enhancement direction may be understood as the directional enhanced data in the direction of $\psi=90$ degrees, for example, the directional enhanced data in the direction of $\psi=90$ degrees may be the directional enhanced data D2 in Table 2, that is, the directional enhanced data D2=(to-be-enhanced speech data B1\*k12+to-be-enhanced speech data B2\*k22+to-be-enhanced speech data B3\*k32+to be enhanced speech data B4\*k42). Therefore, in this case, the sound amplitude of the sound sub-signal that is transmitted by the user A and included in the directional enhanced data D2 is relatively large, and the sound amplitude of the sound sub-signal transmitted by user B is relatively small. Similarly, the target user terminal may determine the enhancement direction of $\psi=180$ degrees in the beamformer as the target enhancement direction, and in this case, there is no first user in the target enhancement direction, that is, both the user A and the user B are referred to as the second user. In this case, the target user terminal may inhibit, based on the beamformer in the target enhancement direction, interference data generated by the sound sub-signals transmitted by the user A and the user B (that is, the second user), to output the enhanced first speech signal. In this case, the enhanced first speech signal obtained by the target user terminal in the target enhancement direction may be understood as the directional enhanced data in the direction of $\psi=180$ degrees, for example, the directional enhanced data in the direction of $\psi=180$ degrees may be the directional enhanced data D3 in Table 2, that is, the directional enhanced data D3=(to-be-enhanced speech data B1\*k13+to-be-enhanced speech data B2\*k23+to-be-enhanced speech data B3\*k33+to be enhanced speech data B4\*k43). Therefore, in this case, the sound amplitudes of the sound sub-signals that are transmitted by the user A and the user B and included in the directional enhanced data D3 are both relatively small.

It can be learned that, if the environmental space includes sound signals transmitted by a plurality of users, corresponding enhanced speech information may be separately obtained in specified directions such as 0-degree, 90-degree, and 180-degree directions (that is, enhancement directions) based on the beamformer in the embodiment corresponding to FIG. 4, that is, three pieces of enhanced speech information may be obtained. The sound amplitudes presented in the corresponding enhancement directions of the three pieces of enhanced speech information are not necessarily the same, and it can also be understood that the volume levels are not necessarily the same. For example, when the sound source and the enhancement direction are in the same direction, the sound for controlling the terminal may be enhanced, and when the sound source and the enhancement direction are not in the same direction, the sound for controlling the terminal may need to be inhibited.

The specific process of obtaining the directional enhanced data in the target enhancement direction (that is, any one of a plurality of enhancement directions) based on the beamformer may be described as: the target user terminal may enhance, based on the beamformer, the sound sub-signal transmitted by the first user in the speech data set, and inhibit, in the target enhancement direction, the sound sub-signal transmitted by the second user (the sound sub-signal transmitted by the second user is interference data in the target enhancement direction), to output the enhanced first speech signal. The first user is a user in the target enhancement direction, and the second user is a user in an enhancement direction in the plurality of enhancement directions except the target enhancement direction. Further, the target user terminal may use the enhanced first speech signal as the directional enhanced data in the target enhancement direction.

The beamformer shown in FIG. 4 may include, but is not limited to, a superdirectional beamformer or a supercardioid beamformer, or other types of beamformers based on algorithms such as minimum variance distortionless response (MVDR) or multiple signal classification algorithm (MUSIC, matrix feature space decomposition). In addition, the noise canceler shown in FIG. 4 is used for inhibiting the noise that is in the environment and carried in the directional enhanced data in each enhancement direction, and the reverb canceler shown in FIG. 4 is used for reducing or eliminating the reverb caused by a room in the environmental space or the like.

Step S102: Match a speech hidden feature in the enhanced speech information with a target matching word, and determine an enhancement direction corresponding to enhanced speech information having a highest degree of matching with the target matching word as a target audio direction.

Further, the target user terminal may obtain a speech hidden feature in each piece of enhanced speech information based on a first wake-up detection model, one speech hidden feature being a feature obtained after feature extraction is performed by the first wake-up detection model on a speech spectrum feature in one piece of enhanced speech information. Further, the target user terminal may perform speech recognition on each speech hidden feature based on a target matching word, to obtain a speech recognition result corresponding to the first wake-up detection model, the speech recognition result including a degree of matching between a speech hidden feature corresponding to each enhancement direction and the target matching word. Further, the target user terminal may determine, according to the speech recognition result, an enhancement direction corresponding to the enhanced speech information having a highest degree of matching with the target matching word as the target audio direction.

Figure 7:
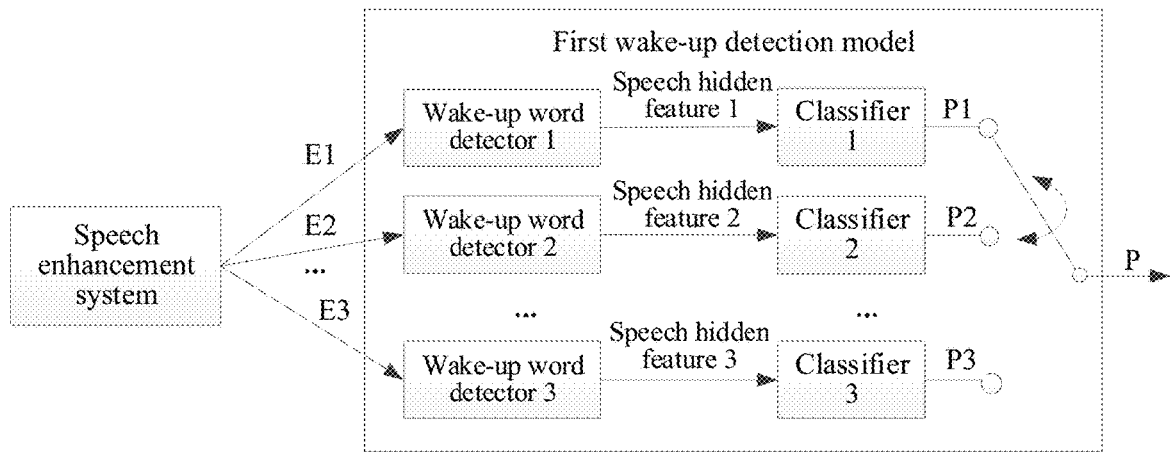
FIG. 7 is a schematic diagram of determining a target audio direction according to one or more embodiments of the present disclosure.

For ease of understanding, further, FIG. 7 is a schematic diagram of determining a target audio direction according to one or more embodiments of the present disclosure. As shown in FIG. 7, the first wake-up detection model may be the multi-directional matching word detection model 300 in the embodiment corresponding to FIG. 2. The speech enhancement system may be the speech enhancement system 200 in the embodiment corresponding to FIG. 2, and with reference to the enhanced speech information obtained in a plurality of enhancement directions in step S102, the enhanced speech information E1, the enhanced speech information E2, and the enhanced speech information E3 obtained in the speech enhancement system shown in FIG. 7 may be further sent to a corresponding wake-up word detector, to obtain the speech hidden feature in each piece of enhanced speech information. As shown in FIG. 7, each wake-up word detector (that is, the wake-up word detector 1, the wake-up word detector 2, and the wake-up word detector 3) in the first wake-up detection model may be used for receiving enhanced speech information from a corresponding enhancement direction. The number of wake-up word detectors in the first wake-up detection model depends on the number of enhancement directions in the speech enhancement system. Therefore, if the enhancement directions of the speech enhancement system shown in FIG. 7 are respectively $\psi=0$ degree, $\psi=90$ degrees, and $\psi=180$ degrees, and the enhanced speech information E1 outputted by the speech enhancement system may be understood as a directional sound signal in the 0-degree direction, the enhanced speech information E2 outputted by the speech enhancement system may be understood as a directional sound signal in the 90-degree direction, and the enhanced speech information E3 outputted by the speech enhancement system may be understood as a directional sound signal in the 180-degree direction, the wake-up word detector 1 in the first wake-up detection model shown in FIG. 7 may be used for receiving a directional sound signal from the direction of $\psi=0$ degree (that is, receiving the enhanced speech information E1), the wake-up word detector 2 in the first wake-up detection model may be used for receiving a directional sound signal from the direction of $\psi=90$ degrees (that is, receiving the enhanced speech information E2), and the wake-up word detector 3 in the first wake-up detection model may be used for receiving a directional sound signal from the direction of $\psi=180$ degrees (that is, receiving the enhanced speech information E3).

For ease of understanding, in this embodiment of the present disclosure, how to obtain a matching degree P1 corresponding to the enhanced speech information E1 by using the wake-up word detector 1 and a classifier 1 is described by using an example that the enhanced speech information E1 is sent to the wake-up word detector 1. A speech spectrum feature in the enhanced speech information E1 may be obtained based on the wake-up word detector 1, to further obtain the speech hidden feature 1 shown in FIG. 7 from the speech spectrum feature.

When the directional sound signal (that is, the enhanced speech information E1) received by the wake-up word detector 1 is an analog signal, a time domain waveform of sound in the analog signal can only represent a change of sound with time, and cannot well represent sound features. Therefore, a sound waveform may need to be converted into an acoustic feature vector, that is, it may be understood that a speech spectrum feature may need to be obtained from the enhanced speech information. The speech spectrum feature may include but is not limited to features such as Mel-frequency cepstral coefficients (MFCC), Mel-scale filter bank (Fbank), and linear predictive cepstral coding (LPCC) commonly used for speech recognition.

The MFCC feature extraction mainly includes two key steps: converting, through Fourier transform, the enhanced speech information E1 received by the wake-up word detector 1 to a Mel frequency, to obtain a signal spectrum corresponding to the enhanced speech information E1, and then further performing log transform on the signal spectrum, to obtain a logarithmic spectrum corresponding to the signal spectrum, and further performing Fourier inverse transform on the logarithmic spectrum, to obtain a cepstrum corresponding to the logarithmic spectrum, to perform cepstral analysis on the converted cepstrum, to obtain an MFCC feature corresponding to the enhanced speech information E1. Further, the speech hidden feature 1 may be extracted from the MFCC feature based on the wake-up word detector 1, to further send the speech hidden feature 1 to the classifier 1 shown in FIG. 7, that is, the classifier 1 may be used for performing speech recognition on the speech hidden feature 1 based on a plurality of attribute type features corresponding to the target matching word, to obtain a speech recognition result corresponding to the classifier 1 in the first wake-up detection model. The speech recognition result includes a degree of matching between the speech hidden feature 1 corresponding to the enhancement direction (the direction of $\psi=0$ degrees) and the target matching word.

The feature extraction algorithm corresponding to the MFCC feature is based on a cepstrum, and more conforms to auditory principles of humans. Therefore, the MFCC feature extraction algorithm is a most common and most effective sound feature extraction algorithm. The target user terminal may alternatively obtain the speech hidden feature 1 by using another method for extracting an acoustic feature vector. For example, after obtaining the foregoing MFCC feature, the target user terminal may further obtain the speech hidden feature through a hidden Markov model or a neural network model. The target user terminal may also obtain the speech hidden feature shown in FIG. 7 from the enhanced speech information E1 through the hidden Markov model or the neural network model.

For the specific process of obtaining the matching degree P2 by using the wake-up word detector 2 and the classifier 2, and obtaining the matching degree P3 by using the wake-up word detector 3 and the classifier 3 by the target user terminal, reference may be made to the specific implementation process of obtaining the matching degree P1 in this embodiment of the present disclosure, and details are not described herein again. The wake-up word detector 1, the wake-up word detector 2 and the wake-up word detector 3 may use the same feature extraction algorithm or the same feature extraction model, to obtain a corresponding speech hidden feature.

Further, the target user terminal may obtain a degree of matching between each speech hidden feature and a plurality of wake-up features in the first wake-up detection model based on the first wake-up detection model, and associate the matching degree obtained in the first wake-up detection model with the target matching word corresponding to the plurality of wake-up features in the first wake-up detection model, to obtain a speech recognition result corresponding to the first wake-up detection model, the speech recognition result including a degree of matching between the speech hidden feature corresponding to each enhancement direction and the target matching word.

In the embodiment corresponding to FIG. 4, a value range of a horizontal angle ($\psi$) in an XOY plane centering around the target user terminal may be 0 to 360 degrees. Therefore, the enhancement direction in the speech enhancement system may be any angle in the value range. The angle of the enhancement direction and the number of the enhancement directions are not limited herein.

For ease of understanding, in this embodiment of the present disclosure, using an example that the enhancement directions in the speech enhancement system are the three directions of $\psi=0$ degree, 90 degrees, and 180 degrees, the target user terminal may obtain a matching degree P1 (for example, 0.95) between the speech hidden feature 1 and the target matching word, a matching degree P2 (for example, 0.85) between the speech hidden feature 2 and the target matching word, and a matching degree P3 (for example, 0.5) between the speech hidden feature 3 and the target matching word respectively in the three enhancement directions. Because the matching degree P1 is greater than the matching degree P2, and the matching degree P2 is greater than the matching degree P3, the matching degree P1 may be determined as the largest matching degree (that is, the matching degree P shown in FIG. 7) obtained by the first wake-up detection model. Because the matching degree P1 is a degree of matching between the speech hidden feature 1 in the direction of $\psi=0$ degree and the target matching word, the target user terminal may further determine, according to the speech recognition result, an enhancement direction corresponding to enhanced speech information having a highest degree of matching with the target matching word as the target audio direction. In other words, the target audio direction in this case is a direction in which the horizontal direction angle $\psi=0$ degree.

In the process of selecting the target audio direction, it may be understood that, when degrees of matching between speech hidden features in a plurality of enhancement directions and the target matching word are all greater than a matching threshold corresponding to the first wake-up detection model, enhancement directions corresponding to the plurality of matching degrees greater than the matching threshold corresponding to the first wake-up detection model may be used as candidate audio directions. In this case, the target user terminal may select, from the candidate audio directions, an enhancement direction corresponding to enhanced speech information having the highest matching degree as the target audio direction, to facilitate subsequent feature authentication only for the speech feature (that is, a spliced vector feature) in the determined target audio direction, to improve the efficient of feature authentication, and ensure the accuracy of control.

Step S103: Obtain speech spectrum features in the enhanced speech information, and obtain, from the speech spectrum features, a speech spectrum feature in the target audio direction.

In certain embodiments, the target user terminal may obtain the speech spectrum feature in the enhanced speech information in each enhancement direction by using the second wake-up detection model, and store the obtained speech spectrum feature in each enhancement direction. Therefore, the target user terminal may further select, from the stored plurality of speech spectrum features based on the target enhancement direction determined in step S102, the speech spectrum feature in the target enhancement direction.

For the specific process of obtaining the speech spectrum feature by the second wake-up detection model, reference may be made to the specific process of obtaining the speech spectrum feature corresponding to the speech hidden feature by using the first wake-up detection model in step S102, and details are not described herein again. To improve the efficiency of obtaining the speech spectrum feature, the first wake-up detection model and the second wake-up detection model may synchronously extract speech spectrum features in enhanced speech information in a plurality of enhancement directions outputted by the speech output system in the embodiment corresponding to FIG. 2, to effectively improve the efficiency of subsequent feature authentication.

Step S104: Perform speech authentication on a speech hidden feature and the speech spectrum feature that are in the target audio direction based on the target matching word, to obtain a target authentication result, the target authentication result being used for representing a probability of existence of the target matching word in the target audio direction for controlling a terminal.

In certain embodiments, the target user terminal may obtain the speech hidden feature in the target audio direction from the first wake-up detection model, and obtain, based on a buffer in the second wake-up detection model, the speech spectrum feature that is in the target audio direction and stored in the buffer, and splice the speech spectrum feature and the speech hidden feature in the target audio direction, to obtain a spliced vector feature. In other words, the target user terminal may splice the speech spectrum feature corresponding to the second wake-up detection model and the speech hidden feature corresponding to the first wake-up detection model in the target audio direction, to obtain the spliced vector feature in the target audio direction. Further, the target user terminal may input the spliced vector feature into the second wake-up detection model, and output a degree of matching between the spliced vector feature and a target wake-up feature in the second wake-up detection model, and generate a target authentication result according to the matching degree outputted by the second wake-up detection model. If the matching degree in the target authentication result is greater than or equal to a matching threshold corresponding to the target matching word, the terminal is controlled (for example, the terminal may be woken up).

Figure 8:
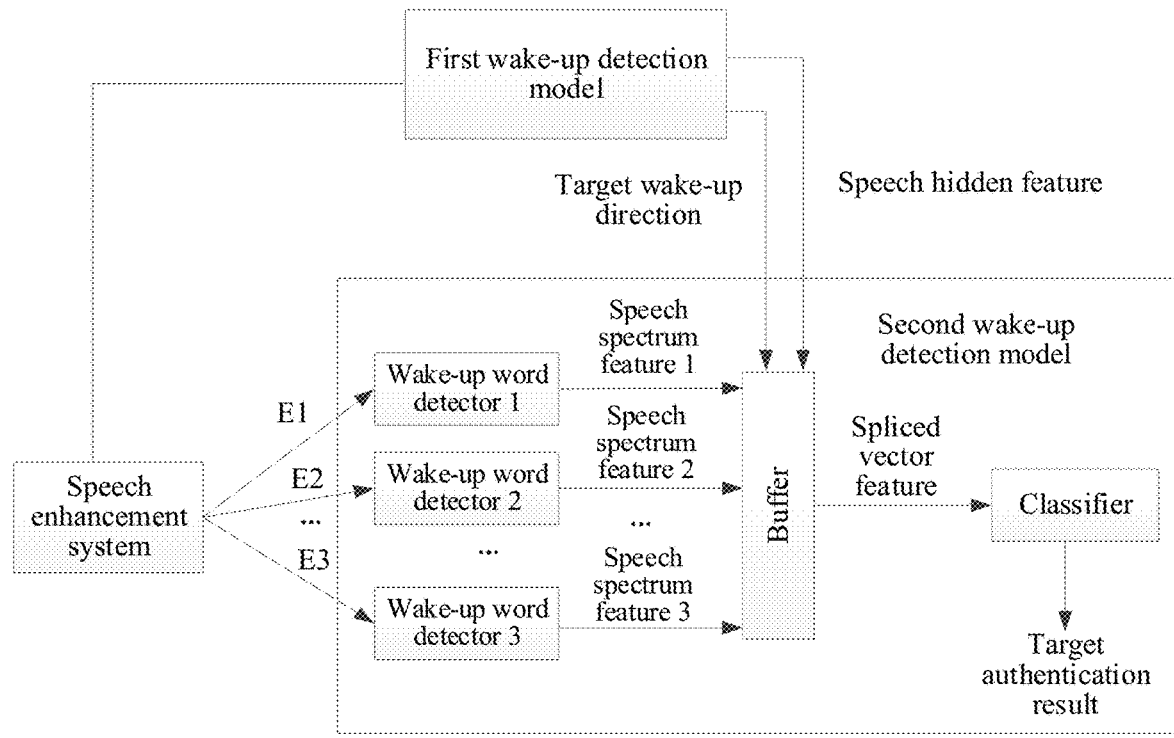
FIG. 8 is a schematic diagram of obtaining a target authentication result according to one or more embodiments of the present disclosure.

For ease of understanding, further, FIG. 8 is a schematic diagram of obtaining a target authentication result according to an embodiment of the present disclosure. As shown in FIG. 8, the target user terminal may include the first wake-up detection model. The first wake-up detection model is used for determining a direction of a sound source most possibly including the target matching word, and determining the direction as the target audio direction. In other words, the target user terminal may determine, based on the first wake-up detection model, an enhancement direction corresponding to enhanced speech information having the highest or largest matching degree as the target audio direction. Then, the target user terminal may further obtain, from the first wake-up detection model, the speech hidden feature corresponding to the target audio direction, for example, with reference to the direction of $\psi=0$ degree of the target audio direction determined in the embodiment corresponding to FIG. 7, send the speech hidden feature 1 in the direction of $\psi=0$ degree to the buffer shown in FIG. 8. In addition, the buffer shown in FIG. 8 further includes speech spectrum features extracted from the enhanced speech information by detectors such as the wake-up word detector 1, the wake-up word detector 2, and the wake-up word detector 3 in the second wake-up detection model. As shown in FIG. 8, the target user terminal may extract the speech spectrum feature 1 from the enhanced speech information E1 based on the wake-up word detector 1 in the second wake-up detection model, extract the speech spectrum feature 2 from the enhanced speech information E2 based on the wake-up word detector 2 in the second wake-up detection model, and extract the speech spectrum feature 3 from the enhanced speech information E3 based on the wake-up word detector 3 in the second wake-up detection model. Then the target user terminal may further store the speech spectrum feature 1, the speech spectrum feature 2, and the speech spectrum feature 3 into the buffer shown in FIG. 8, so that after determining the target audio direction (that is, the direction of $\psi=0$ degree) based on the first wake-up detection model, the target user terminal can directly obtain the speech spectrum feature 1 (the acoustic vector feature extracted by the second wake-up detection model) and the speech hidden feature 1 (the acoustic vector feature that is extracted by the first wake-up detection model and stored in the buffer) in the direction of $\psi=0$ degree (the target audio direction) for vector splicing, to obtain the spliced vector feature in the target enhancement direction shown in FIG. 8. Finally, the target user terminal may further send the spliced vector feature to a classifier in the second wake-up detection model, to output a degree of matching (for example, 0.86) between the spliced vector feature and a target wake-up feature in the second wake-up detection model, and generate a target authentication result according to the matching degree outputted by the second wake-up detection model. Further, if the matching degree (0.86) in the target authentication result is greater than or equal to a matching threshold (for example, 0.7) corresponding to the target matching word, the terminal may be controlled. That is, after matching and authentication on the acoustic model are performed by the target user terminal, the target user terminal may be woken up.

Figure 9:
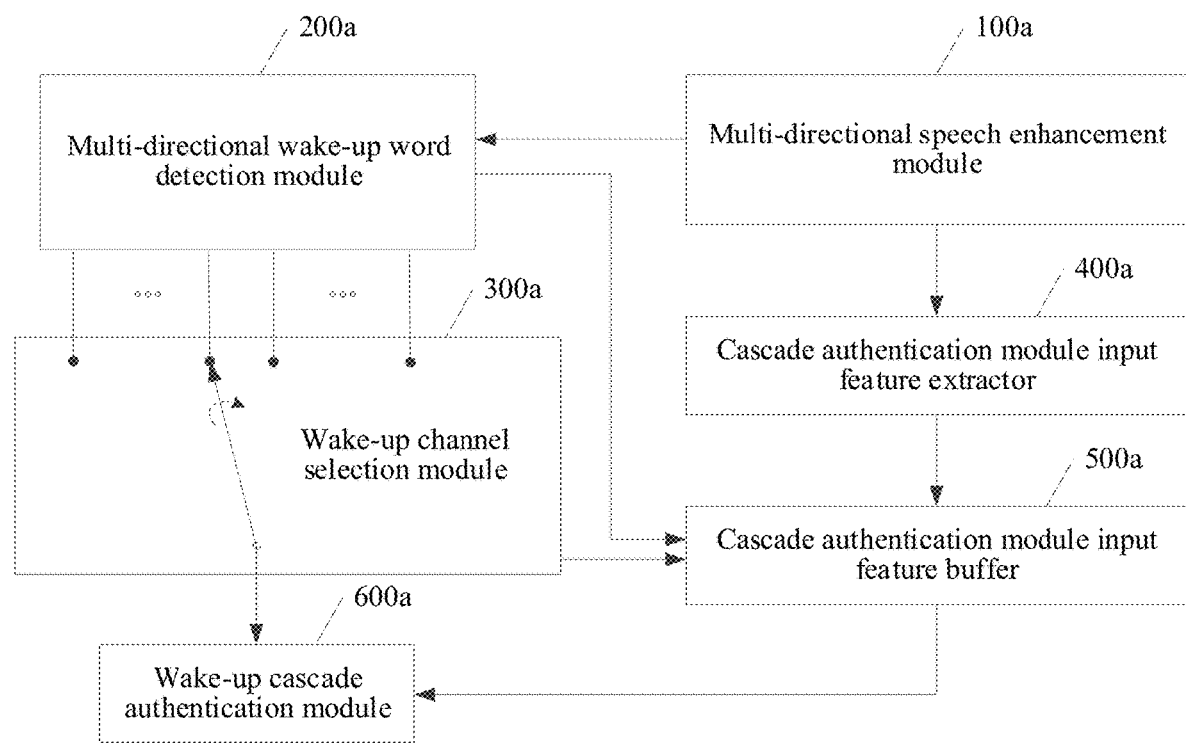
FIG. 9 is a schematic structural diagram of a cascade authentication system according to one or more embodiments of the present disclosure.

Further, FIG. 9 is a schematic structural diagram of a cascade authentication system according to an embodiment of the present disclosure. By integrating FIG. 8 with FIG. 9, a cascade authentication system shown in FIG. 9 may be obtained. A multi-directional speech enhancement module 100a is the speech enhancement system shown in FIG. 7. To improve the efficiency of subsequent speech authentication, after obtaining the enhanced speech information in each enhancement direction (for example, the enhanced speech information E1 in the direction of $\psi=0$ degree), the multi-directional speech enhancement module 100a may further send the obtained enhanced speech information separately to the multi-directional wake-up word detection module 200a and a cascade authentication module input feature extractor 400a shown in FIG. 9, so that the speech spectrum feature in the enhanced speech information in each enhancement direction can be simultaneously extracted in the multi-directional wake-up word detection module 200a and the cascade authentication module input feature extractor 400a. The multi-directional wake-up word detection module 200a is the first wake-up detection model in the embodiment corresponding to FIG. 7. Therefore, when extracting the speech spectrum feature corresponding to each enhancement direction, the multi-directional wake-up word detection module 200a may further obtain the speech hidden feature in each speech spectrum feature (further, reference may also be made to the specific process of obtaining the speech hidden feature shown in FIG. 7), to further send the obtained speech hidden feature to the corresponding classifier, to obtain the speech recognition result corresponding to the first wake-up detection model shown in FIG. 7, to determine the target audio direction according to the speech recognition result, to select, from a wake-up channel selection module 300a shown in FIG. 9, a channel corresponding to the target audio direction as a wake-up channel, and start data exchange between the multi-directional wake-up word detection module 200a and a wake-up cascade authentication module 600a. It may be understood that, in the wake-up channel selection module 300a shown in FIG. 9, if degrees of matching between speech hidden features corresponding to a plurality of channels and the target matching word are all greater than a recognition threshold set by the multi-directional wake-up word detection module 200a, a channel corresponding to the largest matching degree may be determined from the channels as the wake-up channel. The target user terminal may alternatively determine, from the channels, a channel that is first obtained through calculation and that corresponds to a matching degree greater than recognition threshold as the wake-up channel. As shown in FIG. 9, after determining the wake-up channel, the target user terminal sends a matching degree in the target wake-up direction to the wake-up cascade authentication module 600a, so that when the spliced vector feature in the target wake-up direction is subsequently inputted into the wake-up cascade authentication module 600a, the target user terminal can determine, based on the matching degree outputted by the wake-up cascade authentication module 600a, whether the spliced vector feature in the target wake-up direction can sufficiently represent a target matching word for controlling the terminal. The spliced vector feature in the target audio direction is a feature obtained after vector splicing is performed on the speech spectrum feature in the direction and the speech hidden feature in the direction stored in the cascade authentication module input feature buffer 500a. The speech spectrum feature is the feature extracted by the cascade authentication module input feature extractor 400a, and the speech hidden feature is the feature extracted by the multi-directional wake-up word detection module 200a. The second wake-up detection model in the embodiment corresponding to FIG. 8 may include the cascade authentication module input feature buffer 500a and the wake-up cascade authentication module 600a.

It can be learned that, it can be preliminarily determined by using the first wake-up detection model in step S103 that, when there is the target matching word in the target audio direction, to prevent the first wake-up detection model from misjudging, it can be further authenticated by using the second wake-up detection model, whether the spliced vector feature in the target audio direction can sufficiently represent the target matching word. If the second wake-up detection model determines that the inputted spliced vector feature sufficiently represents the target matching word, that is, when the matching degree in the target authentication result outputted by the second wake-up detection model is greater than or equal to the matching threshold corresponding to the target matching word, it may be determined that the wake-up word corresponding to the terminal is detected; and otherwise, it is considered that the wake-up word corresponding to the terminal is not detected, so that the mis-wake-up can be effectively avoided, to ensure the accuracy of terminal wake-up.

If the target user terminal determines that the matching degree in the target authentication result is less than matching threshold corresponding to the target matching word, it is determined that the authentication fails, and the speech acquisition module is notified of obtaining multi-path audio data in the environmental space.

For example, still using the degree of matching between the spliced vector feature outputted by the target user terminal and the target wake-up feature in the second wake-up detection model in the embodiment corresponding to FIG. 8 as an example, if in this case, the matching degree in the target authentication result is 0.65, and the matching threshold set by the classifier in the second wake-up detection model is 0.7, the target user terminal may determine that the matching degree (0.65) in the target authentication result is less than the matching threshold (for example, 0.7) corresponding to the target matching word, and may further determine that the target matching word is not included in the target enhancement direction, which also indirectly authenticates that the first wake-up detection model has misjudgment, so that step S101 to step S104 can be further repeatedly performed when the authentication fails, to ensure that the target user terminal can accurately and correctly wake up the terminal.

Figure 10:
FIG. 10 is a schematic flowchart of another audio data processing method according to one or more embodiments of the present disclosure.

Further, FIG. 10 is a schematic flowchart of an audio data processing method according to one or more embodiments of the present disclosure. As shown in FIG. 10, the method may include:

Step S201: Obtain a microphone array corresponding to an environmental space in which a terminal is located.

The microphone array includes a plurality of microphones, and array structures corresponding to the microphones.

Step S202: Acquire an audio signal in the environmental space based on the array structure of each of the microphones.

The audio signal includes at least one speech signal.

Step S203: Separately determine the at least one speech signal acquired by the each of the microphones as one-path audio data corresponding to the each of the microphones.

One-path audio data is the at least one speech signal acquired by one microphone.

One-path audio data corresponding to the each microphone includes a first speech signal and a second speech signal, the first speech signal being a sound signal that is transmitted by a user and acquired by the microphone array, and the second speech signal being a sound signal that is transmitted by the terminal and acquired by the microphone array.

Step S204: Obtain a target microphone from the microphones of the microphone array, and use audio data that includes the first speech signal and the second speech signal and that corresponds to the target microphone as target audio data.

Step S205: Reduce or eliminate the second speech signal in the target audio data by using an echo canceler, and determine the target audio data from which the second speech signal is reduced or eliminated as to-be-enhanced speech data.

Step S206: Obtain to-be-enhanced speech data separately corresponding to each path of audio data, when or in response to determining the each of the microphones in the microphone array is the target microphone.

Step S207: Separately add each piece of to-be-enhanced speech data to the speech data set.

Step S208: Select any one of the plurality of enhancement directions of a beamformer as a target enhancement direction, enhance the first speech signal in the speech data set based on the beamformer, and use the enhanced first speech signal as directional enhanced data in the target enhancement direction.

Step S209: Filter out environmental noise carried in the directional enhanced data based on a noise canceler and a reverb canceler, and determine the directional enhanced data from which the environmental noise is filtered out as the enhanced speech information corresponding to the speech data set.

Step S210: When or in response to determining each of the plurality of enhancement directions is selected as the target enhancement direction, obtain the enhanced speech information of the speech data set in the enhancement directions.

For the specific implementation of step S201 to step S210, reference may be made to the description about step S101 in the embodiment corresponding to FIG. 3, and details are not described herein again.

Step S211: Match a speech hidden feature in the enhanced speech information in each enhancement direction with a target matching word, and determine an enhancement direction corresponding to enhanced speech information having a highest degree of matching with the target matching word as a target audio direction.

Step S212: Obtain speech spectrum features in the enhanced speech information in the enhancement directions, and obtain, from the speech spectrum features, a speech spectrum feature in the target audio direction.

Step S213: Perform speech authentication on a speech hidden feature and the speech spectrum feature that are in the target audio direction based on the target matching word, to obtain a target authentication result.

The target authentication result is used for representing a probability of existence of the target matching word in the target audio direction for controlling a terminal.

For the specific implementation of step S211 to step S213, reference may be made to the description about step S102 to step S104 in the embodiment corresponding to FIG. 3, and details are not described herein again.

Figure 11:
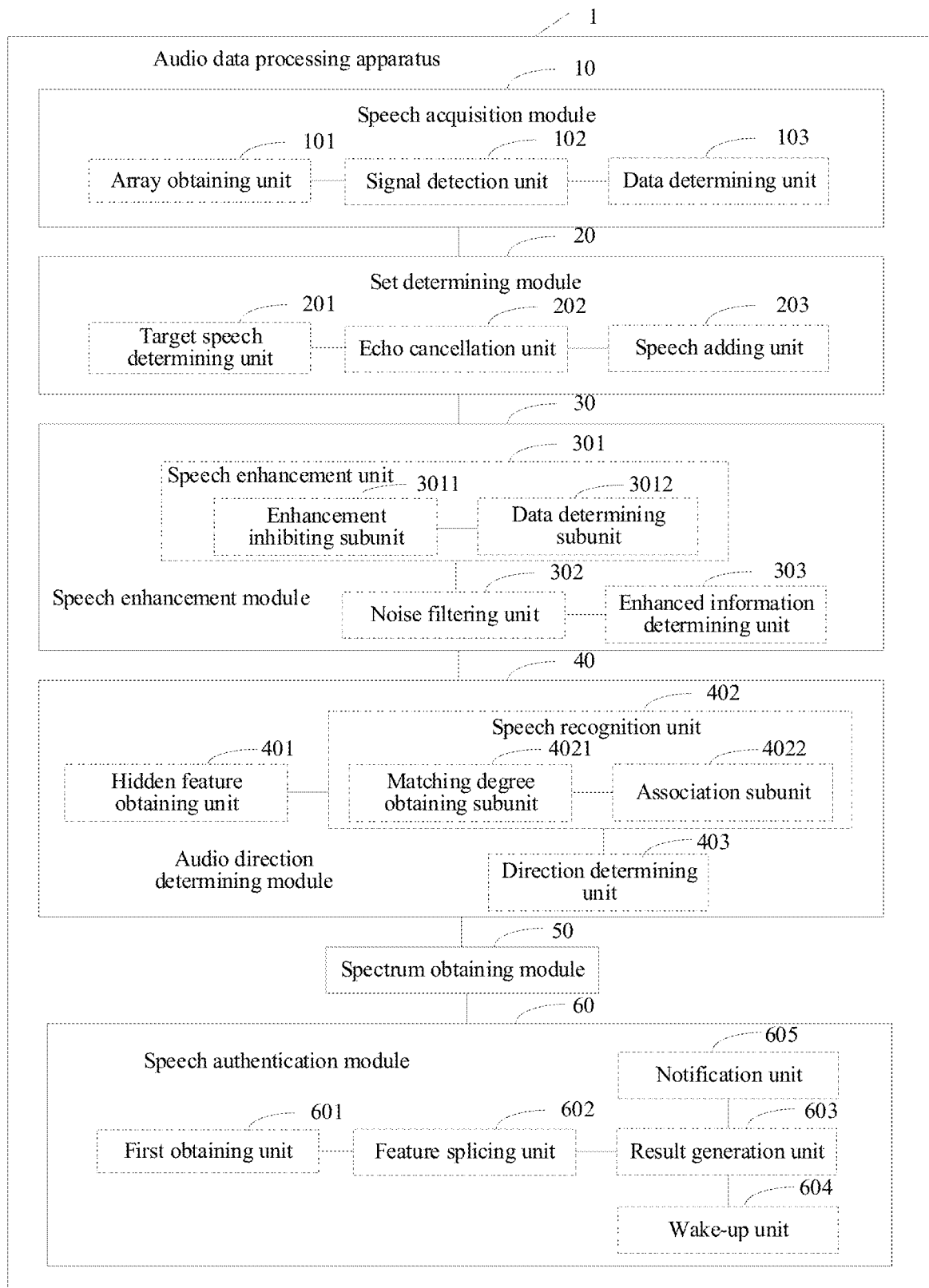
FIG. 11 is a schematic structural diagram of an audio data processing apparatus according to one or more embodiments of the present disclosure.

Further, FIG. 11 is a schematic structural diagram of an audio data processing apparatus according to one or more embodiments of the present disclosure. The audio data processing apparatus may be integrated in the target user terminal in the embodiment corresponding to FIG. 1. As shown in FIG. 11, the audio data processing apparatus may include: a speech acquisition module 10, a set determining module 20, a speech enhancement module 30, an audio direction determining module 40, a spectrum obtaining module 50, and a speech authentication module 60.

The speech acquisition module 10 is configured to obtain multi-path audio data in an environmental space.

The speech acquisition module 10 includes: an array obtaining unit 101, a signal detection unit 102, and a data determining unit 103.

The array obtaining module 101 is configured to obtain a microphone array corresponding to the environmental space in which the terminal is located, the microphone array including a plurality of microphones, and array structures corresponding to the microphones.

The signal detection unit 102 is configured to acquire an audio signal in the environmental space based on the array structure of each of the microphones, the audio signal including at least one speech signal.

The data determining unit 103 is configured to separately determine the at least one speech signal acquired by the each of the microphones as one-path audio data corresponding to the each of the microphones, the one-path audio data being the at least one speech signal acquired by one microphone.

For the specific implementation of the array obtaining unit 101, the signal detection unit 102, and the data determining unit 103, reference may be made to the description about obtaining each path of audio data in step S101 in the embodiment corresponding to FIG. 3, and details are not described herein again.

The set determining module 20 is configured to obtain a speech data set based on the multi-path audio data.

The one-path audio data corresponding to the each of the microphones includes a first speech signal and a second speech signal, the first speech signal being a sound signal that is transmitted by a user and acquired by the microphone array, the second speech signal being a sound signal that is transmitted by the terminal and acquired by the microphone array.

The set determining module 20 includes: a target speech determining unit 201, an echo cancellation unit 202, and a speech adding unit 203.

The target speech determining unit 201 is configured to obtain a target microphone from the microphones of the microphone array, and use audio data that includes the first speech signal and the second speech signal and that corresponds to the target microphone as target audio data.

The echo cancellation unit 202 is configured to reduce or eliminate the second speech signal in the target audio data by using an echo canceler, and determine the target audio data from which the second speech signal is reduced or eliminated as to-be-enhanced speech data.

The echo cancellation unit 202 is further configured to obtain to-be-enhanced speech data separately corresponding to each path of audio data, when or in response to determining the each of the microphones in the microphone array is the target microphone.

The speech adding unit 203 is configured to separately add each piece of to-be-enhanced speech data to the speech data set.

For the specific implementation of the target speech determining unit 201, the echo cancellation unit 202, and the speech adding unit 203, reference may be made to the description about obtaining the speech data set in step S101 in the embodiment corresponding to FIG. 3, and details are not described herein again.

The speech enhancement module 30 is further configured to separately generate, in a plurality of enhancement directions, enhanced speech information corresponding to the speech data set.

The speech enhancement module 30 includes: a speech enhancement unit 301, a noise filtering unit 302, and an enhanced information determining unit 303.

The speech enhancement unit 301 is configured to select any one of the plurality of enhancement directions of a beamformer as a target enhancement direction, enhance the first speech signal in the speech data set based on the beamformer, and use the enhanced first speech signal as directional enhanced data in the target enhancement direction.

The first speech signal in the speech data set includes a sound sub-signal transmitted by a first user and a sound sub-signal transmitted by a second user, the first user being a user in the target enhancement direction, and the second user being a user in one of the plurality of enhancement directions except the target enhancement direction.

The speech enhancement unit 301 includes an enhancement inhibiting subunit 3011 and a data determining subunit 3012.

The enhancement inhibiting subunit 3011 is configured to enhance, based on the beamformer, the sound sub-signal transmitted by the first user in the first speech signal, and inhibit, in the target enhancement direction, interference data generated by the sound sub-signal transmitted by the second user, to output the enhanced first speech signal.

The data determining subunit 3012 is configured to use the enhanced first speech signal as the directional enhanced data in the target enhancement direction.

For the specific implementation of the enhancement inhibiting subunit 3011 and the data determining subunit 3012, reference may be made to the description about obtaining the directional enhanced data in the target audio direction in step S101 in the embodiment corresponding to FIG. 3, and details are not described herein again.

The noise filtering unit 302 is configured to filter out environmental noise carried in the directional enhanced data based on a noise canceler and a reverb canceler, and determine the directional enhanced data from which the environmental noise is filtered out as the enhanced speech information corresponding to the speech data set.

The enhanced information determining unit 303 is configured to: when or in response to determining each of the plurality of enhancement directions is selected as the target enhancement direction, obtain the enhanced speech information of the speech data set in the enhancement directions.

For the specific implementation of the speech enhancement unit 301, the noise filtering unit 302, and the enhanced information determining unit 303, reference may be made to the description about obtaining each piece of enhanced speech information in step S101 in the embodiment corresponding to FIG. 3, and details are not described herein again.

The audio direction determining module 40 is configured to match a speech hidden feature in the enhanced speech information with a target matching word, and determine an enhancement direction corresponding to enhanced speech information having a highest degree of matching with the target matching word as a target audio direction.

The audio direction determining module 40 includes: a hidden feature obtaining unit 401, a speech recognition unit 402, and a direction determining unit 403.

The hidden feature obtaining unit 401 is configured to obtain a speech hidden feature in enhanced speech information in each enhancement direction based on a first wake-up detection model, one speech hidden feature being a feature obtained after feature extraction is performed by the first wake-up detection model on a speech spectrum feature of one piece of enhanced speech information.

The speech recognition unit 402 is configured to perform speech recognition on each speech hidden feature based on the target matching word, to obtain a speech recognition result corresponding to the first wake-up detection model, the speech recognition result including a degree of matching between the speech hidden feature corresponding to the each enhancement direction and the target matching word.

The speech recognition unit 402 includes a matching degree obtaining subunit 4021 and an association subunit 4022.

The matching degree obtaining subunit 4021 is configured to obtain, based on the first wake-up detection model, a degree of matching between the each speech hidden feature and a plurality of wake-up features in the first wake-up detection model.

The association subunit 4022 is configured to associate the degree of matching obtained by the first wake-up detection model with the target matching word corresponding to the plurality of wake-up features in the first wake-up detection model, to obtain the speech recognition result corresponding to the first wake-up detection model.

For the specific implementation of the matching degree obtaining subunit 4021 and the association subunit 4022, reference may be made to the description about obtaining the target audio direction in step S102 in the embodiment corresponding to FIG. 3, and details are not described herein again.

The direction determining unit 403 is configured to determine, based on the speech recognition result, the enhancement direction corresponding to the enhanced speech information having the highest degree of matching with the target matching word as the target audio direction.

For the specific implementation of the hidden feature obtaining unit 401, the speech recognition unit 402, and the direction determining unit 403, reference may be made to the description about obtaining the target audio direction step S102 in the embodiment corresponding to FIG. 3, and details are not described herein again.

The spectrum obtaining module 50 is configured to obtain speech spectrum features in the enhanced speech information, and obtain, from the speech spectrum features, a speech spectrum feature in the target audio direction.

The speech authentication module 60 is configured to perform speech authentication on a speech hidden feature and the speech spectrum feature that are in the target audio direction based on the target matching word, to obtain a target authentication result, the target authentication result being used for representing a probability of existence of the target matching word in the target audio direction for controlling a terminal.

The speech spectrum feature in the enhanced speech information is extracted by a second wake-up detection model.

The speech authentication module 60 includes: a first obtaining unit 601, a feature splicing unit 602, a result generating unit 603, and a wake-up unit 604. The speech authentication module 600 further includes a notification unit 605.

The first obtaining unit 601 is configured to obtain the speech hidden feature in the target audio direction from the first wake-up detection model.

The feature splicing unit 602 is configured to splice the speech spectrum feature and the speech hidden feature in the target audio direction, to obtain a spliced vector feature.

The result generation unit 603 is configured to input the spliced vector feature into the second wake-up detection model, output a degree of matching between the spliced vector feature and a target wake-up feature in the second wake-up detection model, and generate the target authentication result according to the degree of matching outputted by the second wake-up detection model.

The wake-up unit 604 is configured to wake up the terminal when or in response to determining the degree of matching in the target authentication result is greater than or equal to a matching threshold corresponding to the target matching word.

The notification unit 605 is configured to determine that authentication fails when or in response to determining the degree of matching in the target authentication result is less than the matching threshold corresponding to the target matching word, and notify the speech acquisition module 10 of obtaining multi-path audio data in an environmental space.

For the specific implementation of the first obtaining unit 601, the feature splicing unit 602, the result generating unit 603, the wake-up unit 604, and the notification unit 605, reference may be made to the description about step S104 in the embodiment corresponding to FIG. 3, and details are not described herein again.

For the specific implementation of the speech acquisition module 10, the set determining module 20, the speech enhancement module 30, the audio direction determining module 40, the spectrum obtaining module 50, and the speech authentication module 60, reference may be made to the description about step S101 to step S104 in the embodiment corresponding to FIG. 3, and details are not described herein again.

In this embodiment of the present disclosure, the terminal may obtain the multi-path audio data in the environmental space, that is, the terminal may use all audio signals acquired by a microphone in a microphone array including a plurality of microphones in an environmental space in which the terminal is located as one-path audio data corresponding to one microphone, to obtain multi-path audio data. Further, the terminal may obtain the speech data set based on the multi-path audio data, so that the terminal can generate the enhanced speech information corresponding to the speech data set in a plurality of enhancement directions, that is, one-path enhanced speech information can be generated in each enhancement direction, to improve the accuracy of speech recognition. In other words, the terminal may separately perform, in each enhancement direction, speech enhancement on sound signals of a user included in the speech data set, to filter out noise interference in the environmental space, and output, in different enhancement directions, enhanced speech information corresponding to the sound signals of the user, so that there is always one enhancement direction in the plurality of enhancement directions that includes enhanced speech information carrying the target matching word, to improve the detection rate of the matching word, thereby improving the accuracy of control. Then, the terminal may further match the obtained speech hidden features of the plurality of pieces of enhanced speech information with the target matching word. Each of the plurality of pieces of enhanced speech information in this case has directivity. Therefore, the terminal may further determine an enhancement direction corresponding to the enhanced speech information having a highest degree of matching with the target matching word as the target audio direction, that is, preliminarily determine that there is the target matching word in the target audio direction. Finally, the terminal may further obtain a speech spectrum feature in the enhanced speech information in the target audio direction, and perform secondary speech authentication by using the speech hidden feature and the speech spectrum feature in the target audio direction, to accurately authenticate whether there is, in the target audio direction, the target matching word for controlling the terminal, to reduce the miscontrol rate, thereby improving the accuracy of speech control. That is, the false-recognition rate can be effectively reduced by further authenticating the speech spectrum feature in the determined direction.

Figure 12:
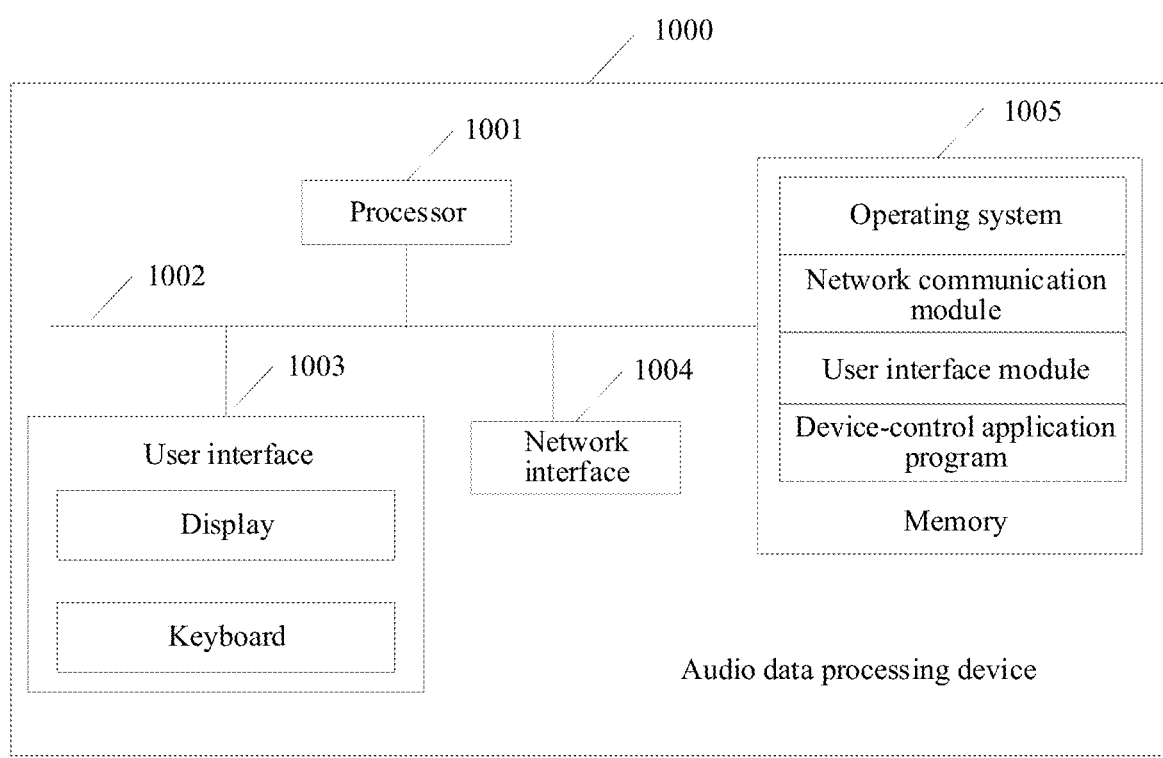
FIG. 12 is a schematic structural diagram of an audio data processing device according to one or more embodiments of the present disclosure.

Further, FIG. 12 is a schematic structural diagram of an audio data processing device according to one or more embodiments of the present disclosure. As shown in FIG. 12, the audio data processing device 1000 may be applied to the target user terminal in the embodiment corresponding FIG. 1 and the audio data processing device 1000 may include: a processor 1001, a network interface 1004, and a memory 1005, as well as a user interface 1003 and at least one communication bus 1002. The communication bus 1002 is configured to implement connection and communication between the components. The user interface 1003 may include a display and a keyboard. The user interface 1003 may further include a standard wired interface or wireless interface. The network interface 1004 may include a standard wired interface or wireless interface (for example, a Wi-Fi interface). The memory 1004 may be a high-speed RAM, or may be a non-transitory memory, for example, at least one magnetic disk memory. The memory 1005 may alternatively be at least one storage device located away from the processor 1001. As shown in FIG. 12, the memory 1005 used as a computer storage medium may include an operating system, a network communication module, a user interface module, and a device-control application program.

The network interface 1004 in the audio data processing device 1000 may receive a sound signal transmitted by a user in an environmental space, and the user interface 1003 may further include a display and a keyboard. In the audio data processing device 1000 shown in FIG. 12, the network interface 1004 may provide a network communication function. The user interface 1003 is mainly configured to provide an input interface for a user. The processor 1001 may be configured to call the device-control application program stored in the memory 1005, to implement the following operations: obtaining multi-path audio data in an environmental space, obtaining a speech data set based on the multi-path audio data, and separately generating, in a plurality of enhancement directions, enhanced speech information corresponding to the speech data set; matching a speech hidden feature in the enhanced speech information with a target matching word, and determining an enhancement direction corresponding to enhanced speech information having a highest degree of matching with the target matching word as a target audio direction; obtaining speech spectrum features in the enhanced speech information, and obtaining, from the speech spectrum features, a speech spectrum feature in the target audio direction; and performing speech authentication on a speech hidden feature and the speech spectrum feature that are in the target audio direction based on the target matching word, to obtain a target authentication result, the target authentication result being used for representing a probability of existence of the target matching word in the target audio direction for controlling a terminal.

The audio data processing device 1000 described in this embodiment of the present disclosure can implement the descriptions of the audio data processing method in the embodiments corresponding to FIG. 3 and FIG. 10, and can also implement the descriptions of the audio data processing apparatus in the embodiment corresponding to FIG. 11. Details are not described herein again. In addition, beneficial effects achieved by using the same method are not described herein again.

In addition, an embodiment of the present disclosure further provides a computer storage medium. The computer storage medium stores a computer program executed by the audio data processing apparatus mentioned above, and the computer program includes program instructions. When executing the program instructions, the processor can perform the descriptions of the audio data processing method in the embodiments corresponding to FIG. 3 and FIG. 10. Therefore, details are not described herein again. In addition, beneficial effects achieved by using the same method are not described herein again. For technical details that are not disclosed in the embodiment of the computer storage medium of the present disclosure, refer to the descriptions of the method embodiments of the present disclosure.

A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM), or the like.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software. Each module/unit or submodule/subunit can be implemented using one or more processors (or processors and memory). Likewise, a processor (or processor and memory) can be used to implement one or more modules/units or submodules/subunits. Moreover, each module/unit may be developed using a computer programming language, or be part of an overall module/unit that is developed using a computer programming language to encompass the functionalities of each module/unit.

What are disclosed herein above are merely examples of embodiments of the present disclosure, and are not intended to limit the protection scope of the present disclosure. Equivalent variations made in accordance with the following claims shall fall within the scope of the present disclosure.

What is claimed is:

1. An audio data processing method, performed by an audio data processing device in communication with a terminal, the terminal including a first microphone and a second microphone, the method comprising:
    obtaining multi-path audio data, by collecting via the first microphone first-path audio data and collecting via the second microphone second-path audio data;
    generating enhanced speech information corresponding to the multi-path audio data, wherein the enhanced speech information includes first enhanced speech information in a first enhancement direction and second enhanced speech information in a second enhancement direction, the first enhanced speech information includes a first parameter (k11) corresponding to the first-path audio data and a first parameter (k21) corresponding to the second-path audio data, and the second enhanced speech information includes a second parameter (k12) corresponding to the first-path audio data and a second parameter (k22) corresponding to the second-path audio data, wherein the parameters k11, k21, k12, and k22 are each used for modifying a phase and an amplitude of the corresponding audio data, and k11 is different than k12 or k21 is different than k22;
    respectively performing speech recognition on the first and the second enhanced speech information by using a first wake-up detection model;
    storing, speech hidden features output by the first wake-up detection model, in a buffer of a second wake-up detection model, each speech hidden feature corresponding to one of the first and the second enhanced speech information;
    according to results of the speech recognition performed on the first and the second enhanced speech information, determining one of the first or the second enhancement direction as a target audio direction; and
    determining a probability of existence of a target matching word in the target audio direction, comprising:
        obtaining the speech hidden feature corresponding to the enhanced speech information of the target audio direction from the buffer;
        determining, by the second wake-up detection model, a speech spectrum feature corresponding to the enhanced speech information of the target audio direction
        concatenating the speech hidden feature and the speech spectrum feature in the target audio direction, to obtain a concatenated vector feature;
        determining, by the second wake-up detection model, a degree of matching between the concatenated vector feature and a target wake-up feature, to generate the probability of existence of the target matching word.

2. The method according to claim 1, wherein the first-path audio data or the second-path audio data includes a first speech signal and a second speech signal, the first speech signal being a sound signal that is transmitted by a user, the second speech signal being a sound signal that is transmitted by the terminal.

3. The method according to claim 2, further comprising:
    reducing the second speech signal by using an echo canceler, prior to generating the enhanced speech information.

4. The method according to claim 1, wherein the enhanced speech information is generated using a beamformer.

5. The method according to claim 1, wherein the first-path audio data is a sound sub-signal transmitted by a first user, the first microphone also collects a sound sub-signal transmitted by a second user and the method further comprises:
    enhancing the sound sub-signal transmitted by the first user in the speech data set, and inhibiting interference data generated by the sound sub-signal transmitted by the second user.

6. The method according to claim 1, further comprising:
    waking up the terminal in response to determining the degree of matching is greater than or equal to a matching threshold corresponding to the target matching word.

7. The method according to claim 1, further comprising:
    determining not to wake up the terminal in response to determining the degree of matching is less than a matching threshold corresponding to the target matching word.

8. The method according to claim 1, further comprising:
    wherein the first-path audio data is represented by B1 and the second-path audio data is represented by B2, and
    wherein the first enhanced speech information D1 is represented by (B1*k11+B2*k21), and the second-path audio data is represented by (B1*k12+B2*k22).

9. An audio data processing apparatus in communication with a terminal, the terminal including a first microphone and a second microphone, the apparatus comprising: a memory storing computer program instructions; and a processor coupled to the memory and configured to executing the computer program instructions and perform:
    obtaining multi-path audio data, by collecting via the first microphone first-path audio data and collecting via the second microphone second-path audio data;
    generating enhanced speech information corresponding to the multi-path audio data, wherein the enhanced speech information includes first enhanced speech information in a first enhancement direction and second enhanced speech information in a second enhancement direction, the first enhanced speech information includes a first parameter (k11) corresponding to the first-path audio data and a first parameter (k21) corresponding to the second-path audio data, and the second enhanced speech information includes a second parameter (k12) corresponding to the first-path audio data and a second parameter (k22) corresponding to the second-path audio data, wherein the parameters k11, k21, k12, and k22 are each used for modifying a phase and an amplitude of the corresponding audio data, and k11 is different than k12 or k21 is different than k22;
    respectively performing speech recognition on the first and the second enhanced speech information by using a first wake-up detection model;
    storing, speech hidden features output by the first wake-up detection model, in a buffer of a second wake-up detection model, each speech hidden feature corresponding to one of the first and the second enhanced speech information;

according to results of the speech recognition performed on the first and the second enhanced speech information, determining one of the first or the second enhancement direction as a target audio direction; and determining a probability of existence of a target matching word in the target audio direction, comprising:
obtaining the speech hidden feature corresponding to the enhanced speech information of the target audio direction from the buffer;
determining, by the second wake-up detection model, a speech spectrum feature corresponding to the enhanced speech information of the target audio direction
concatenating the speech hidden feature and the speech spectrum feature in the target audio direction, to obtain a concatenated vector feature;
determining, by the second wake-up detection model, a degree of matching between the concatenated vector feature and a target wake-up feature, to generate the probability of existence of the target matching word.

10. The apparatus according to claim 9, wherein the first-path audio data or the second-path audio data includes a first speech signal and a second speech signal, the first speech signal being a sound signal that is transmitted by a user, the second speech signal being a sound signal that is transmitted by the terminal.

11. The apparatus according to claim 9, wherein the enhanced speech information is generated using a beamformer.

12. The apparatus according to claim 9, wherein the first-path audio data is a sound sub-signal transmitted by a first user, the first microphone also collects a sound sub-signal transmitted by a second user, and the processor is further configured to perform:
enhancing the sound sub-signal transmitted by the first user in the first speech signal, and inhibit interference data generated by the sound sub-signal transmitted by the second user.

13. A non-transitory electronic-readable storage medium storing computer program instructions executable by at least one processor of an audio data processing apparatus to perform:
obtaining multi-path audio data in an environmental space, obtaining a speech data set based on the multi-path audio data, and separately
obtaining multi-path audio data, by collecting via a first microphone first-path audio data and collecting via a second microphone second-path audio data, wherein the first microphone and the second microphone are included in a terminal, and the terminal is in communication with the audio data processing apparatus;
generating enhanced speech information corresponding to the multi-path audio data, wherein the enhanced speech information includes first enhanced speech information in a first enhancement direction and second enhanced speech information in a second enhancement direction, the first enhanced speech information includes a first parameter (k11) corresponding to the first-path audio data and a first parameter (k21) corresponding to the second-path audio data, and the second enhanced speech information includes a second parameter (k12) corresponding to the first-path audio data and a second parameter (k22) corresponding to the second-path audio data, wherein the parameters k11, k21, k12, and k22 are each used for modifying a phase and an amplitude of the corresponding audio data, and k11 is different than k12 or k21 is different than k22;
respectively performing speech recognition on the first and the second enhanced speech information by using a first wake-up detection model;
storing, speech hidden features output by the first wake-up detection model, in a buffer of a second wake-up detection model, each speech hidden feature corresponding to one of the first and the second enhanced speech information;
according to results of the speech recognition performed on the first and the second enhanced speech information, determining one of the first or the second enhancement direction as a target audio direction; and
determining a probability of existence of a target matching word in the target audio direction, comprising:
obtaining the speech hidden feature corresponding to the enhanced speech information of the target audio direction from the buffer;
determining, by the second wake-up detection model, a speech spectrum feature corresponding to the enhanced speech information of the target audio direction
concatenating the speech hidden feature and the speech spectrum feature in the target audio direction, to obtain a concatenated vector feature;
determining, by the second wake-up detection model, a degree of matching between the concatenated vector feature and a target wake-up feature, to generate the probability of existence of the target matching word.

14. The non-transitory electronic-readable storage medium according to claim 13, wherein the first-path audio data or the second-path audio data includes a first speech signal and a second speech signal, the first speech signal being a sound signal that is transmitted by a user, the second speech signal being a sound signal that is transmitted by the terminal.

15. The non-transitory electronic-readable storage medium according to claim 13, wherein the enhanced speech information is generated using a beamformer.

* * * * *